United States Patent
Motley

(10) Patent No.: US 6,721,282 B2
(45) Date of Patent: Apr. 13, 2004

(54) TELECOMMUNICATION DATA COMPRESSION APPARATUS AND METHOD

(75) Inventor: Cecil F. Motley, Rolling Hills Estates, CA (US)

(73) Assignee: Telecompression Technologies, Inc., Torrance, CA (US)

( * ) Notice: Subject to any disclaimer, the term of this patent is extended or adjusted under 35 U.S.C. 154(b) by 0 days.

(21) Appl. No.: 09/759,733

(22) Filed: Jan. 12, 2001

(65) Prior Publication Data

US 2002/0136224 A1 Sep. 26, 2002

(51) Int. Cl.[7] .......................... H04L 12/26; H04L 12/56
(52) U.S. Cl. .................... 370/252; 370/395.53; 370/465
(58) Field of Search ................................ 370/231, 235, 370/294, 395.53, 401, 407, 465, 467, 525, 526, 252; 379/93.07, 93.08, 93.09, 93.15, 142.07, 142.14, 222.01, 283; 704/207, 500, 501

(56) References Cited

U.S. PATENT DOCUMENTS

| | | | |
|---|---|---|---|
| 4,160,131 A | | 7/1979 | Kaul et al. |
| 4,980,917 A | | 12/1990 | Hutchins |
| 5,200,993 A | | 4/1993 | Wheeler et al. |
| 5,208,897 A | | 5/1993 | Hutchins |
| 5,504,834 A | * | 4/1996 | Fette et al. ................. 704/207 |
| 5,530,655 A | | 6/1996 | Lokhoff et al. |
| 5,548,578 A | * | 8/1996 | Matsune et al. .............. 370/13 |
| 5,608,446 A | * | 3/1997 | Carr et al. ...................... 348/6 |
| 5,623,575 A | | 4/1997 | Fette et al. |
| 5,649,051 A | | 7/1997 | Rothweiler et al. |
| 5,668,925 A | | 9/1997 | Rothweiler et al. |
| 5,778,342 A | | 7/1998 | Erell et al. |
| 5,809,459 A | | 9/1998 | Bergstrom et al. |
| 5,940,479 A | * | 8/1999 | Guy et al. ................ 379/93.01 |
| 6,075,783 A | * | 6/2000 | Voit ........................... 370/352 |
| 6,078,880 A | | 6/2000 | Zinser, Jr. et al. |
| 6,078,884 A | | 6/2000 | Downey |
| 6,138,092 A | | 10/2000 | Zinser, Jr. et al. |
| 6,141,329 A | | 10/2000 | Turner |
| 6,298,045 B1 | * | 10/2001 | Pang et al. .................. 370/261 |
| 6,339,594 B1 | * | 1/2002 | Civanlar et al. ............. 370/352 |
| 6,353,808 B1 | * | 3/2002 | Matsumoto et al. ........ 704/230 |

OTHER PUBLICATIONS

Knuth, D., *The Art of Computer Programming*, vol. 2, Addisson–Wesley, New York, 1998. (p. 27).

Deller, John R., Hansen, John H.L., Proakis, John G., *Discrete Tiem Processign of Speech Signals*, pp. 292–296, IEEE Press, New York, New York, 1993.

O'Shaughnessy, Douglas, *Speech Communication: Human and Machine*, p. 356, Addison–Wesley, New York, New York, 1987.

Madisette, Vijay, and Williams, Douglas, *The Digital Signal Processing Handbook*, CRC Press, Boca Raton, Florida, 1998 (Chapters 44–51).

* cited by examiner

*Primary Examiner*—Alpus H. Hsu
*Assistant Examiner*—Toan D. Nguyen
(74) *Attorney, Agent, or Firm*—Blakely Sokoloff Taylor & Zafman LLP

(57) ABSTRACT

A system is presented including a first telecommunication device connected to a network at a rate adjusted to improve data bandwidth while data integrity is maintained. The first telecommunication device compresses input data received via the network. Additionally, a first router is connected to the first telecommunication device. Also a gateway is connected to the first router and a second router. Also presented is a second telecommunication device connected to the second router. The second telecommunication device decompresses received data.

50 Claims, 21 Drawing Sheets

| CH.NO. ⌐269 | ORIGIN ⌐271 | DEST. ⌐273 | START CONNECT ⌐275 | STOP CONNECT ⌐277 | MODE ⌐279 | CALL NUMBER ⌐281 | SIG DATA ⌐283 |
|---|---|---|---|---|---|---|---|
| 1 | 1 | 1 | 264_12:34:01 | 264_12:44:23 | V | 11-310-555-1212 | R2 |
| 2 | 1 | 0 | 264_12:45:11 | | S | 01-202-555-1212 | SS7 |
| 3 | 0 | | | | | | |
| VOICE CALL COMPLETE | | | | | | | |
| CALL SIGNALING ACTIVE | | | | | | | |
| | | | | | | | |
| N | 1 | 1 | 264_12:55:25 | | F | 22-345-9998 | SS7 |
| FAX CALL ACTIVE | | | | | | | |

FIG. 13

| DECIMAL ADDRESS | GLOBAL MEMORY | | GLOBAL RAM ADDRESS IN HEX | |
|---|---|---|---|---|
| 0 | TRANSFER FLAG A | | 1400000 | S |
| 4 | | | 4 | S |
| | CONTROL REG A | | | |
| 32 | | 20 | | |
| 36 | | | 24 | S |
| | IN VOICE DATA A | | | |
| 11552 | | 2D20 | | |
| 11556 | | | 2D24 | S |
| | IN COMPRESSED DATA A | | | |
| 12064 | | 2D20 | | |
| 12068 | | | 2F24 | S |
| | OUT VOICE DATA A | | | |
| 23584 | | 5C20 | | |
| 23588 | | | 5C24 | S |
| | OUT COMPRESSED DATA A | | | |
| 24096 | | 5E20 | | |
| 24100 | TRANSFER FLAG B | | 5E24 | S |
| 24104 | | | 5E28 | S |
| | CONTROL REG B | | | |
| 24132 | | 5E44 | | |
| 24136 | | 5E48 | | |
| | IN VOICE DATA B | | | |
| 35652 | | 8B44 | | |
| 35656 | | | 8B48 | |
| | IN COMPRESSED DATA B | | | |
| 36164 | | 8D44 | | |
| 36168 | | | 8B48 | |
| | OUT VOICE DATA B | | | |
| 47684 | | BA44 | | |
| 47688 | | | BA48 | |
| | OUT COMPRESSED DATA B | | | |
| 48196 | | BC44 | | |
| 48200 | TRANSFER FLAG C | | BC48 | |
| 48204 | | | BC4C | |

FIG. 19A

| Address | Section | Address |
|---|---|---|
| 48232 | CONTROL REG C | BC68 |
| 48236 | | BC6C |
| | IN VOICE DATA C | |
| 59752 | | E968 |
| 59756 | | E96C |
| | IN COMPRESSION DATA C | |
| 60264 | | EB68 |
| 60268 | | EB6C |
| | OUT VOICE DATA C | |
| 71784 | | 11868 |
| 71788 | | 1186C |
| | OUT COMPRESSION DATA C | |
| 72296 | | 11A68 |
| 72300 | TRANSFER FLAG D | 11A6C |
| 72304 | | 11A70 |
| | CONTROL REG D | |
| 72332 | | 11A8C |
| 72336 | | 11A90 |
| | IN VOICE DATA D | |
| 83852 | | 1478C |
| 83856 | | 14790 |
| | IN COMPRESSION DATA D | |
| 84364 | | 1498C |
| 84368 | | 14990 |
| | OUT VOICE DATA D | |
| 95884 | | 1768C |
| 95888 | | 17690 |
| | OUT COMPRESSION DATA D | |
| 96396 | | 1788C |

FIG. 19B

TELECOMMUNICATION DATA COMPRESSION APPARATUS AND METHOD

BACKGROUND OF THE INVENTION

1. Field of the Invention

This invention relates to telecommunication apparatus that is adapted to extend voice channel capacity. Additionally, the apparatus terminates, compresses/decompresses, demodulates/re-modulates, and buffers channels containing FAX/DATA, modem signals, or call signaling information.

2. Background Art

Current technology includes access servers that allow the voice channels of up to four PSTN T1 lines to be compressed and multiplexed onto one frame relay gateway while providing termination of FAX/DATA and modem data. The voice compression ratios associated with such units are 8:1 to 13:1 employing international telecommunications union (ITU) standards such as code excited linear prediction (CELP), volume software licensing program (VSLP), and ADP32PCM on all channels associated with a T1 PSTN line. Current technology does not permit processing of mixed mode T1 lines (i.e. the mixing of voice channels, FAX/DATA, and modem signals from the same T1 line).

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 4 illustrates an SS7 protocol architecture when common carrier signaling is detected at the embodiment of the invention illustrated in FIG. 3a.

FIG. 13 illustrates a network service queue associated with a network manager that holds status of calls on a channel basis.

FIGS. 19a and 19b illustrate a global random access memory (RAM) memory map to a global RAM in the an embodiment of the invention illustrated in FIG. 18.

SUMMARY OF THE INVENTION

A telecommunication system is presented with a first telecommunication device connected to a network. The first telecommunication device to compress input data received via the network at a rate adjusted to improve data bandwidth while data integrity is maintained. Additionally, a first router is connected to the first telecommunication device. Also a gateway is connected to the first router and a second router. A second telecommunication device is connected to the second router. The second telecommunication device decompresses received data.

DETAILED DESCRIPTION

The invention generally relates to telecommunications apparatus and methods of programming multiple digital signal processors (DSP) and a PC based controller. Referring to the figures, exemplary embodiments of the invention will now be described. The exemplary embodiments are provided to illustrate the invention and should not be construed as limiting the scope of the invention.

Figure 1:
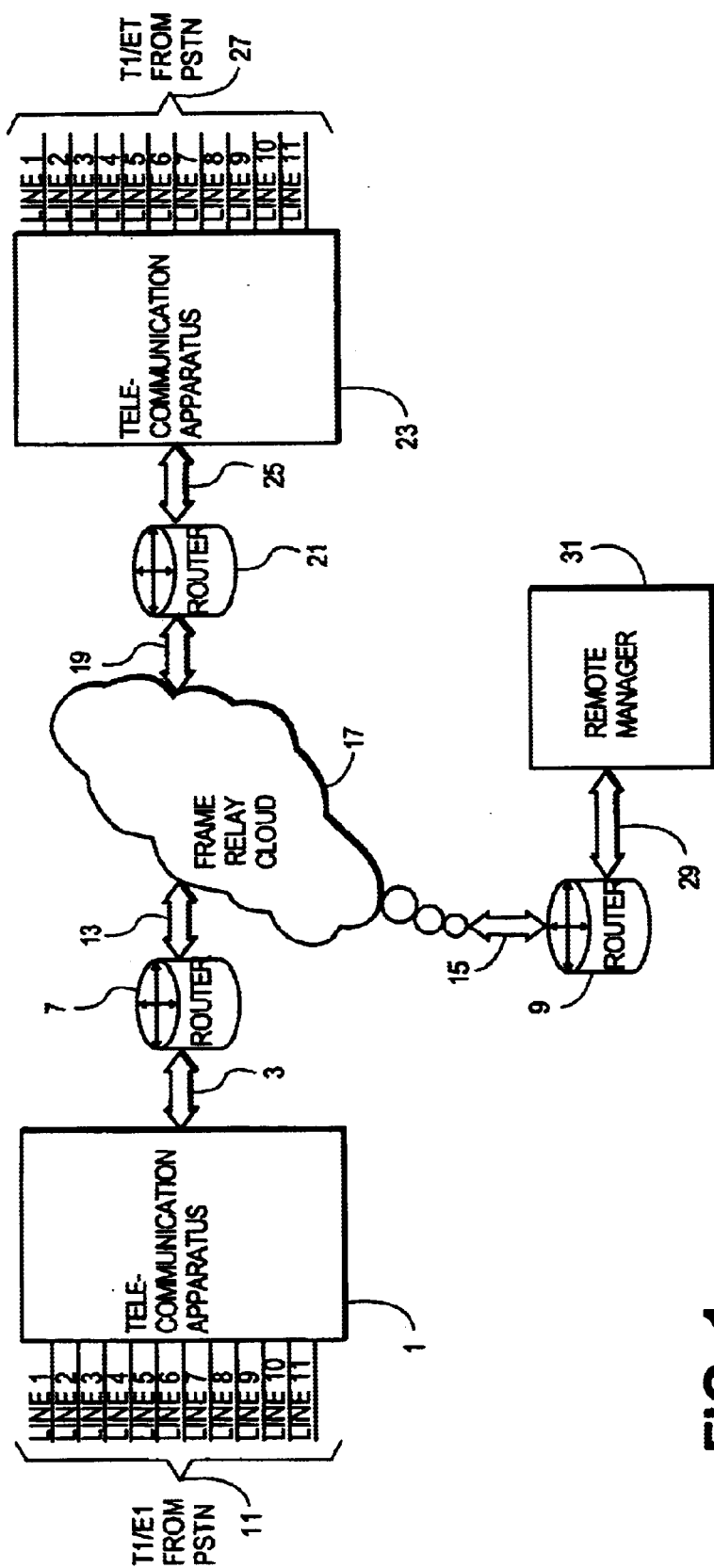
FIG. 1 illustrates a telephone network interconnection system.

FIG. 1 illustrates a telephone network interconnection system with an embodiment of the invention having telecommunication apparatus 1 coupled to a public switched telephone network (PSTN) through multiple T1 or E1 lines 11. Input/output 3 of apparatus 1 is compressed Tx or Ex data multiplexed and converted to Ethernet format. The Ethernet formatted data is sent to high-speed router 7 where it is converted to a digital network (e.g. frame relay) format. Frame relay packets 13 are routed through frame relay cloud 17 until they reach their final destination 19. High-speed router 21 at the termination point converts the packet data back to Ethernet format 25 for decompression by terminating telecommunication apparatus 23. The resulting voice channel traffic is interfaced to the terminating PSTN through Tx or Ex lines 27. Although frame relay data traffic is half-duplex, the disclosed telecommunication apparatus handles the Tx or Ex traffic on a full-duplex basis by time sharing the frame relay bandwidth (approximately half bandwidth used in transmit direction and half bandwidth used in the receive direction).

Remote control and administration of the apparatus is accomplished from remote manager 31 by connecting to frame relay cloud 17 using high-speed router 9. Remote site 31 can be any personal computing device, such as a personal computer (PC) or terminal accessing a network, such as the Internet or frame relay cloud). In the case of Internet access to apparatus 1, in one embodiment of the invention router 9 is a part of the Internet service provider network. Remote administration allows configuration control and performance monitoring as well as call data log recovery from any location with a connection to the cloud.

Figure 2:
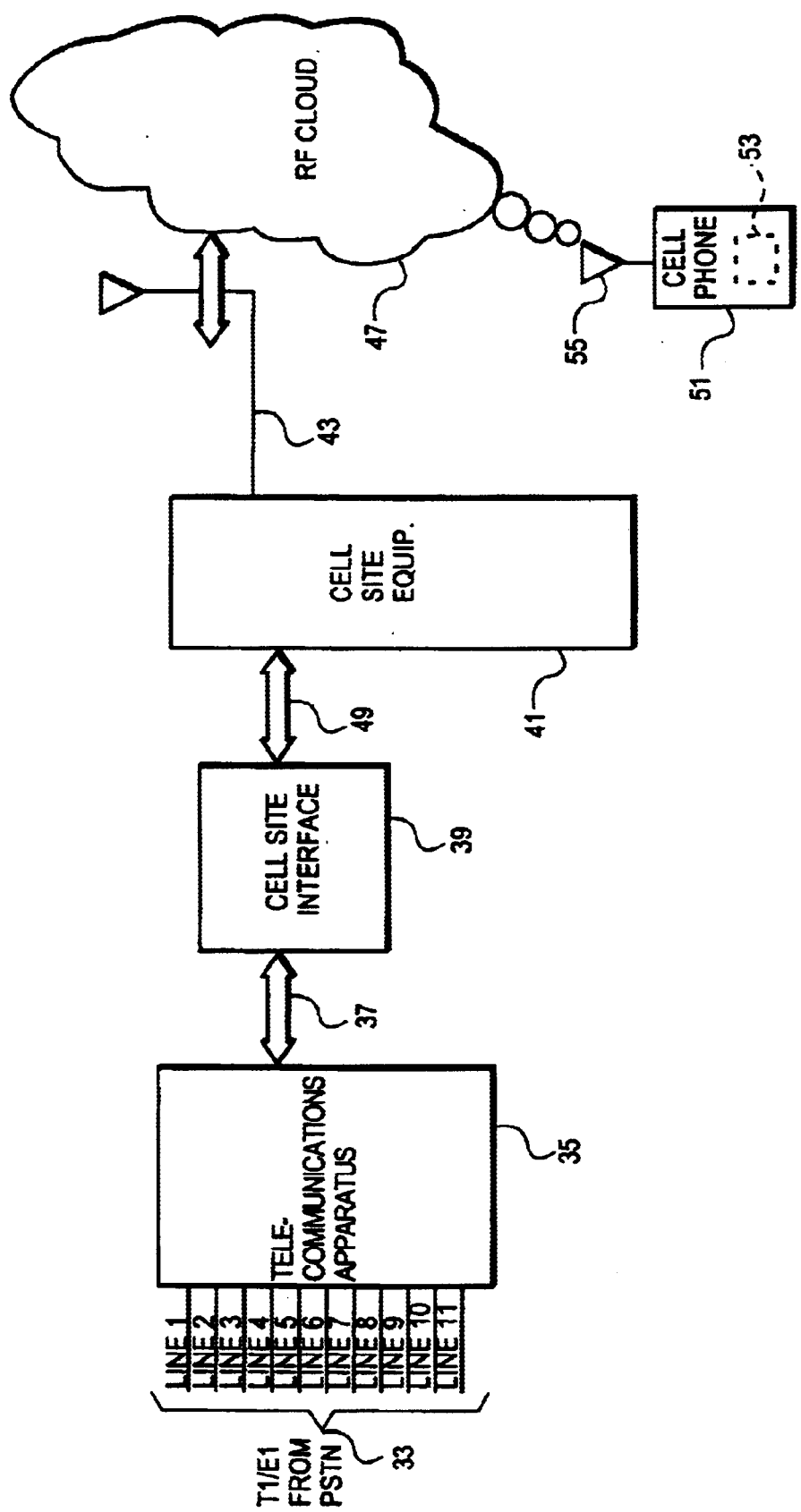
FIG. 2 illustrates a cell phone interconnection system.

FIG. 2 illustrates an embodiment applicable to a cell phone network A single channel version of telecommunication apparatus 35 is implemented on a low power chip 53 that is integrated into cell phone 51. Low power chip 53 implements compression and decompression methods for one voice channel which is then transmitted/received over the standard cell phone RF cloud 47. Cell site 41 receives and transmits in the usual manner over an RF link 43 except that the data rate is 1.6 to 3.6 Kbps. Cell site interface module 39 is included to serialize multiple voice channels originating from several cell phones for processing by telecommunication apparatus 35. The inclusion of cell site interface module 39 allows application of the apparatus without modification. Telecommunication apparatus 35 then compresses/decompresses the voice channels for insertion/abstraction to and from PSTN Tx or Ex lines 33.

Operational Flow

Figure 3A:
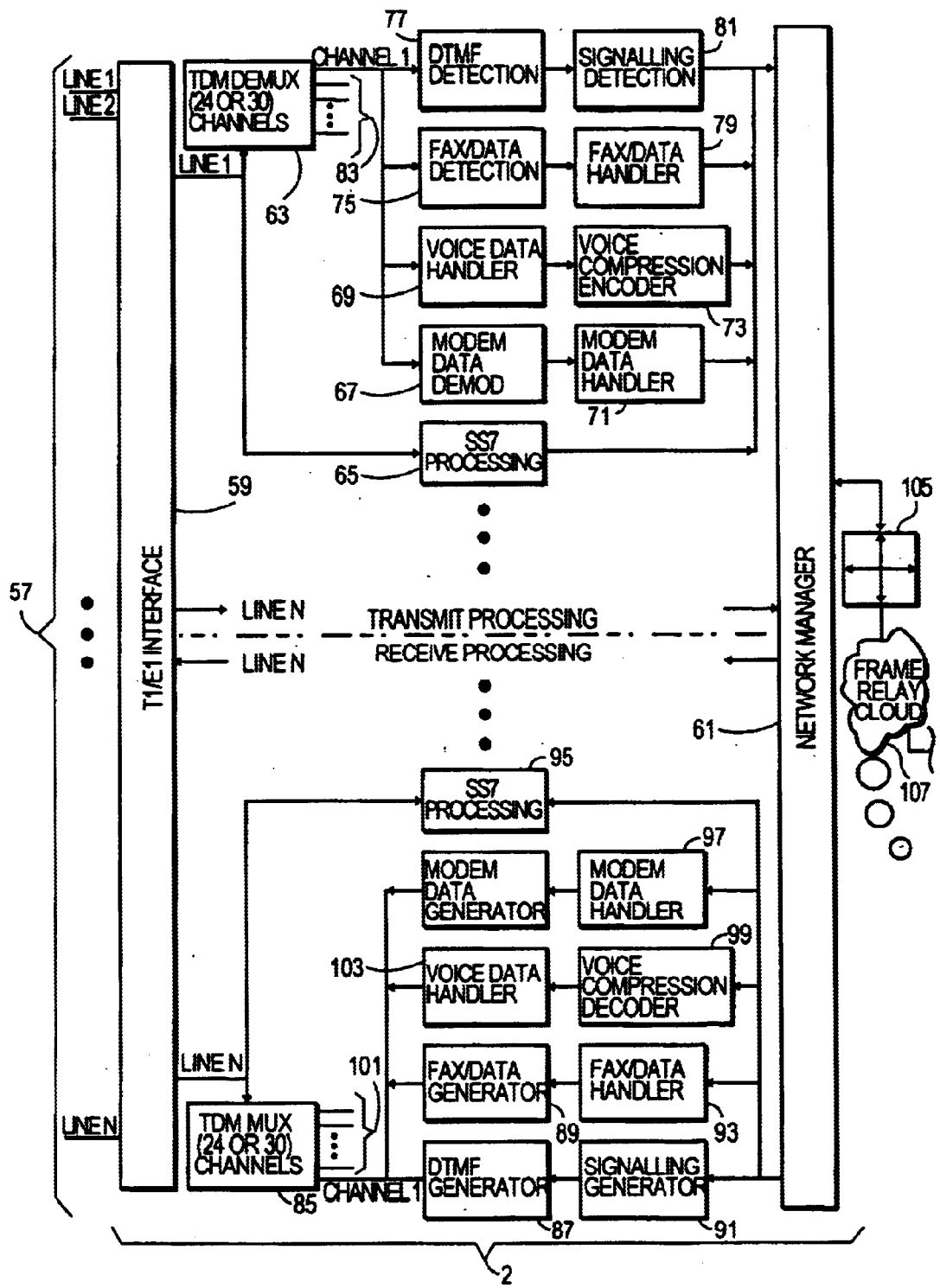
FIGS. 3a and 3b illustrate an operational flow diagram of an embodiment of the invention having a telecommunication apparatus.
Figure 3B:
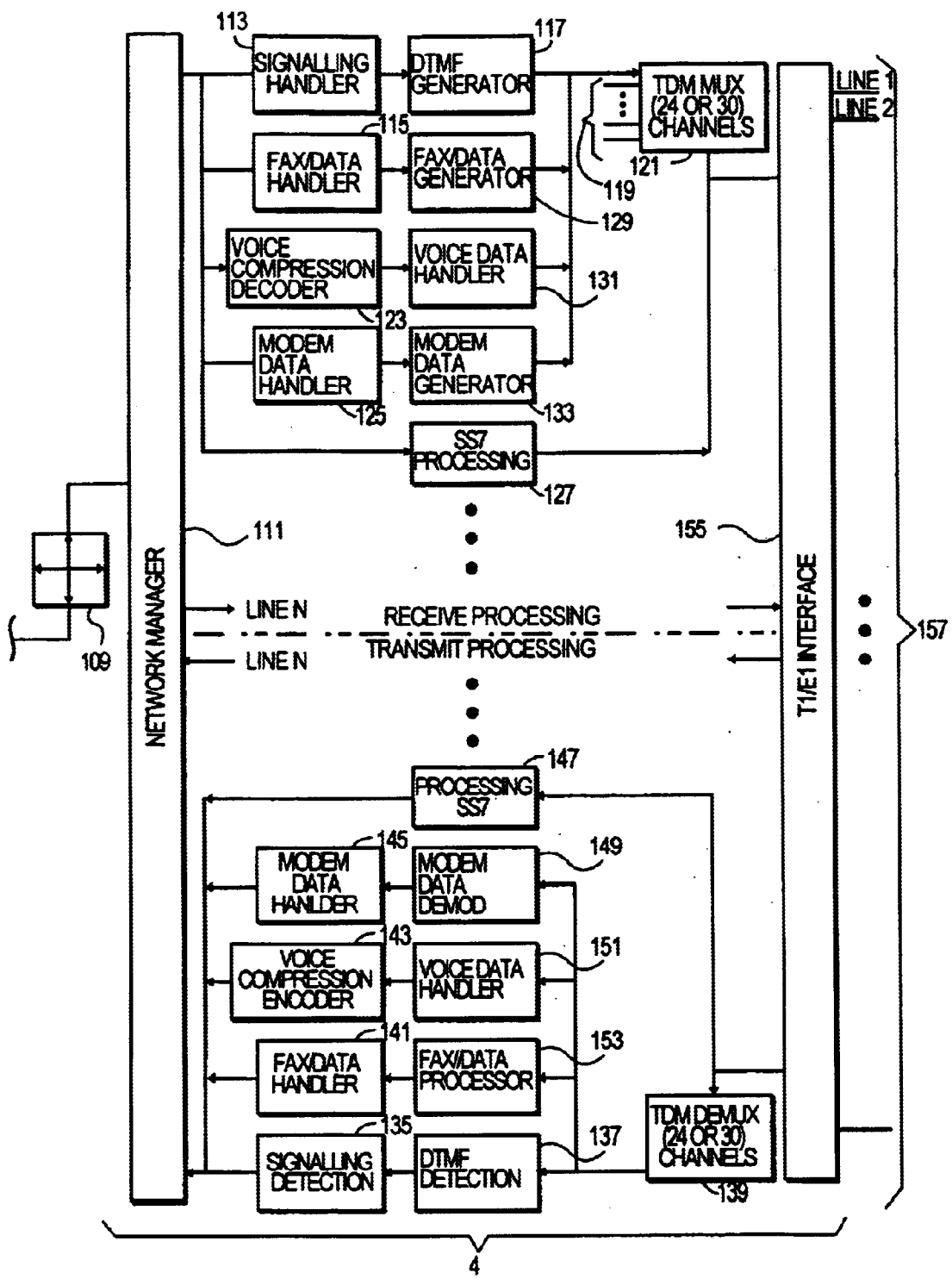

FIGS. 3a and 3b illustrate an operational flow for an embodiment of the invention. One embodiment of the invention compresses multiple PSTN voice channel information for transmission over a frame relay gateway. To be compatible with T1 PSTN interfaces, one embodiment handles FAX/DATA, modem signals, and call signaling and, therefore, the interfaces for these operational modes are included in the operational capabilities. The following description details the processes that occur from the instant a call is placed (hook-up) to the instant a call is completed (hook-down) as they relate to an embodiment of the invention. FIGS. 3a and 3b illustrate two identical apparatus 2 and 4. For ease of discussion, apparatus 2 will originate the call and apparatus 4 will terminate the call.

CSU/DSU Interface

Apparatus 2 illustrated in FIG. 3a interfaces to PSTN T1 lines 57 with built-in channel service unit/data service unit (CSU/DSU) 59 that connects to 4-wire or 2-wire configurations. The number of voice channels processed by apparatus 2 is a function of the capacity of the frame relay gateway. For multiple T1 PSTN operation into one T1 frame relay gateway (1,544,000 bits/sec), the number of channels is two-hundred-and-sixty-four or eleven T1 lines.

Call Originating and Signaling

Figure 4:
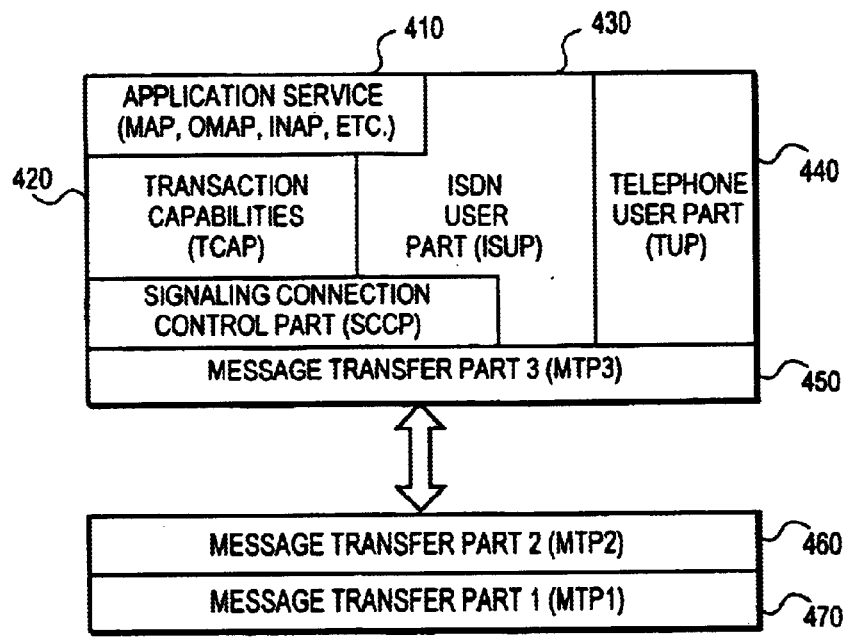

Call originating in a channel within the T1/E1 Time Division Multiplex (TDM) frame is sent to TDM De-Mux 63 where the call (hook-up) is extracted and assembled into eight bit bytes. The byte partitioned information is either in Mu-Law or A-Law format. Each channel from the T1 or E1 is constantly monitored for the presence of dual tone multi-frequency (DTMF) tones at tone detector 77. When tone detection occurs (indicated by hook-up tone signaling) at origination telecommunication apparatus 2, signaling detector 81 is notified and signaling detection operations are started. For in-band signaling, the North American standard Robbed-bit, channel associated signaling (CAS), or common channel signaling (CCS) signaling rules apply. When common carrier signaling is detected, SS7 rules apply and the signaling information is decoded according to the country specific variant of the SS7 standard. The SS7 protocol consists of a number of tightly related layers that work together to provide universal functionality. FIG. 4 illustrates a relationship between the layers and the associated international standards of one embodiment of the invention. Layer 410 is comprised of application services, such as mobile application part (MAP), operation, maintenance, and administration part (OMAP), and intelligent network application protocol (INAP). Layer 420 contains transaction capabilities (TCAP). Layer 430 contains ISDN user part (ISUP). Layer 440 contains telephone user part (TUP). Layer 450 contains message transfer part 3 (MTP3). Layers 460 and 470 contain MTP2 and MTP1, respectively.

In one embodiment the DTMF tone or SS7 signaling process is performed on each channel of the T1 lines as detection occurs. When a call is placed by one or more of the channels, the call number is decoded by detector 77 from the DTMF tones or SS7 signaling information at processor 65. The decoded call number or SS7 signaling information is inserted into the appropriate channel parameter block within a packing queue located in network manager 61. The packing queue is memory space dedicated to storing the data that will eventually form the frame relay output packet. In one embodiment network manager 61 prepares the data located in the packing queue for transmission based on channel capacity optimization.

Output Packet Processing During Signals

Figure 6:
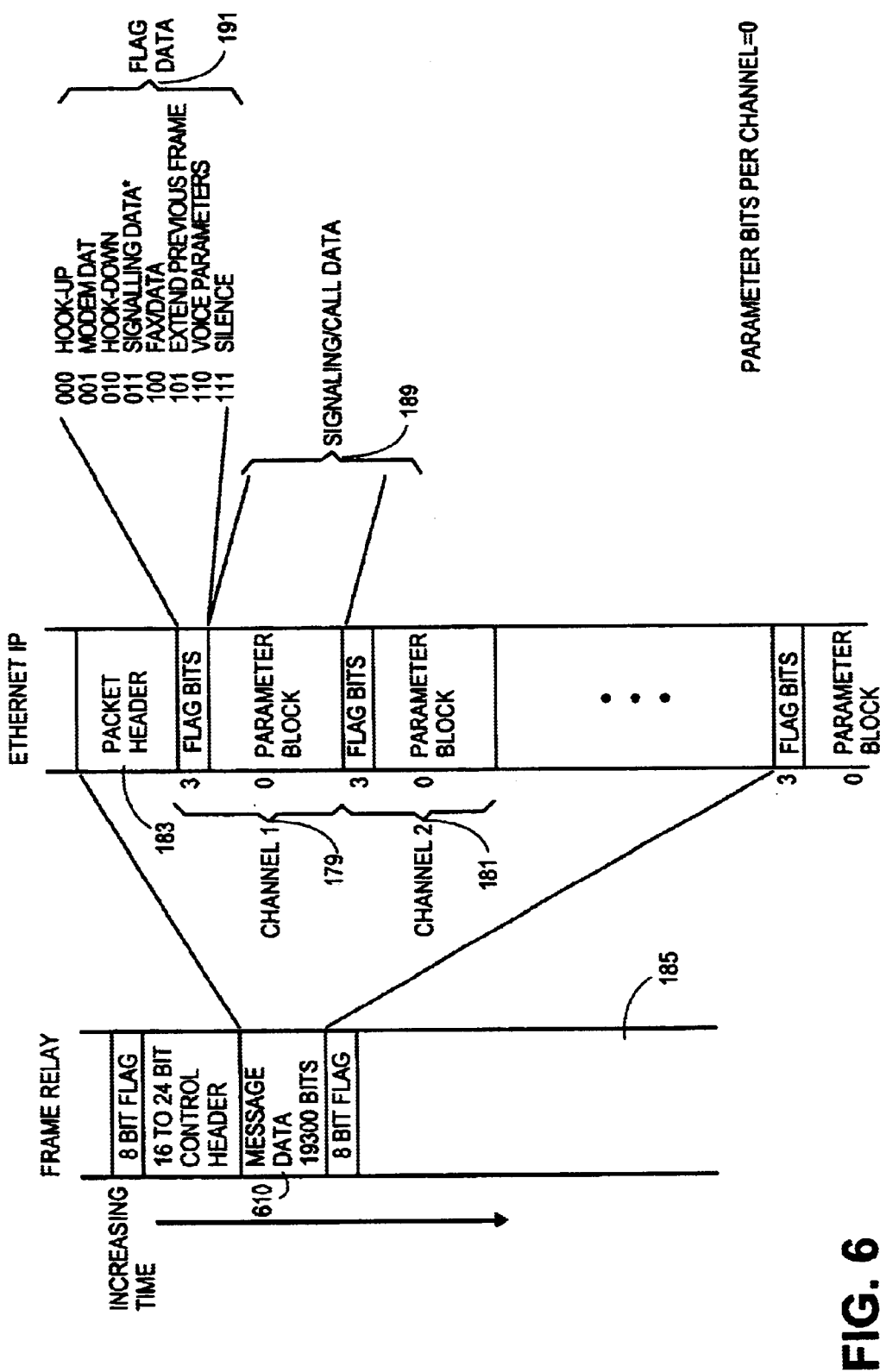
FIG. 6 illustrates packeting information for a frame relay message block during signaling for passing call information.

In one embodiment, after network manager 61 prepares the signaling data for the subject channel, it is inserted into the output packet and converted to Ethernet IP format (designated 187 illustrated in FIG. 6). Network manager 61 performs a sequence of operations on the data located in the packing queue and generates a large (19,300 bit) local area network (LAN) Ethernet TCP/IP packet that is sent to high speed router 105 where it is converted to frame relay format (designated 185 illustrated in FIG. 6).

The frame relay packet is sent through frame relay cloud 107 to destination site router 109. In one embodiment, router 109 converts the frame relay packet back to Ethernet TCP/IP format and transfers it to destination network manager 111 of telecommunication apparatus 4 illustrated in FIG. 3b. Destination network manager 111 extracts the signaling and/or call information from the received packet channel parameter block and routes it to channel signaling handler 113. Channel signal handler 113 causes the designated hook-up and/or dialing tones to be generated by DTMF tone generator 117 and inserted into the appropriate TDM slot location by TDM MUX 121.

Processing Signaling Information at Destination Apparatus

In one embodiment destination network manager 111 monitors any response by observing the outputs from DTMF and signal tone detectors 135 and 137 on the incoming destination channel. When a hook-up is detected that corresponds to the channel being called, the active channel status is set by network manager 111 and the response is inserted in an outgoing frame relay packet from destination telecommunication apparatus 4 illustrated in FIG. 3b to origination telecommunication apparatus 2 illustrated in FIG. 3a.

Updating Origination Call Status

In one embodiment origination network manager 61 monitors incoming packet information for a hook-up status from the channel on which the call was made. When a destination hook-up status is indicated, the origination call status is set to active. Origination network manager 61 then determines the type of information that is being sent over the channel by monitoring incoming signal structure. In one embodiment, unless FAX/DATA tones or modem phase shift keying (PSK) signals are detected, it is assumed that the data is voice.

Sending Fax/Data or Modem Data

When FAX/DATA is detected as the information being sent, FAX/DATA processor 75 is enabled. This processor determines which FAX/DATA structure is being sent, demodulates the signal and stores the resulting data or control characters in a buffer located in FAX/DATA handler 79. Data corresponding to each T1 channel containing FAX/DATA is stored in a separate buffer within data handler 79. This data is transferred to network manager 61 for insertion into parameter blocks as channel space becomes available.

In one embodiment, FAX/DATA information is non real-time and therefore low priority. The insertion of FAX/DATA into outgoing frame relay packets occurs in small eight byte data blocks every 25 msec unless there is low voice traffic in which case the data blocks can be up to 1600 bytes every 25 msec.

In one embodiment, FAX/DATA processor 75 is capable of handling data and Fax traffic according to the following ITU standards:

| DATA | FAX |
| --- | --- |
| V.32bis - 14,400 bps | V.29 - 9600 bps |
| V.32 - 9,600 bps | V.27ter - 4,800 bps |
| V.22 - 1,200 bps | V.17 - 14,400 bps |
| V.21 - 0 to 300 bps | T.30, T.38 (IP FAX control standard) |

FAX/DATA processor 75 handles synchronous and asynchronous formats and supports asymmetrical and symmetrical data rates up to 128 kbps. The asynchronous character codes include (8, 9, 10, or 11-bit characters, V.14 compliant). Error correction complies with ITU-T V.42 and V.42bis with a throughput up to 128 kbps. The configuration and control is "AT" command set compliant. Dialing and Fax control comply with V.25bis dialing and T.30 Fax.

The complete FAX/DATA handling process is implemented in digital signal processors (DSP) software. A typical FAX/DATA process is illustrated in block format in FIG. 5. Signal data from TDM interface 159 is filtered by bandpass filter 161 and then level controlled by automatic gain processor (AGC) 163. The phase shift modulated signal is then demodulated at demodulator 165 using an I-Q sampling technique. Threshold decisions are made at decision device 169 and the corresponding phase shift is performed at signal detector 171 by using recovered carrier 175 as a reference. Decoder 173 converts the phase shift information into the corresponding bit pattern that is transferred to descrambler 177 to recover the actual data.

When a high-speed modem signal is detected at modem data demodulator 67 (illustrated in FIG. 3a) as the data being sent, the high-speed modem processor is enabled. This process is also implemented in DSP software and complies to the following international specifications:

V.90—56,000 bps

V.34—33,600 bps

Figure 5:
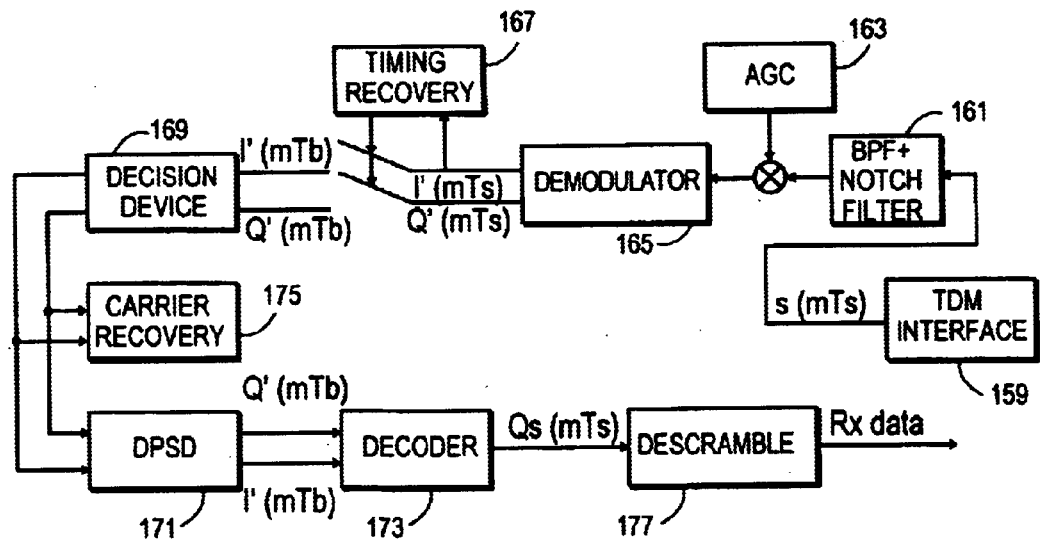
FIG. 5 illustrates a FAX/DATA demodulation technique (i.e. algorithm).

The demodulation process may be implemented as illustrated in FIG. 5 and described above. The primary difference between handling FAX/DATA and modem processing is the timing associated with the high-speed modem data and the requirement for larger decoder. The demodulated and de-scrambled modem data is buffered and compressed by data handler 71 using ITU V.42bis standard. Buffered modem data is transferred to network manager 61 for insertion into the frame relay packet parameter block when channel space is available.

Sending Voice Data

In one embodiment, if voice data is detected at data handler 69 when information is sent, the voice data buffering process is started. In one embodiment two hundred Mu-Law or A-Law eight bit samples are stored for each channel operating in voice mode. In one embodiment double buffers are used to facilitate timing and interfacing to voice compression processor 73. Once a buffer is full (200 samples), the data is transferred to voice compression processor 73. This processor preferably executes a DSP software routine, one example of which will be disclosed in greater detail in a patent application entitled VARIABLE RATE SPEECH DATA COMPRESSION Ser. No. 09/759,734, filed on Jan. 12, 2001, concurrently herewith, and assigned to the assignee of this application.

Figure 8:
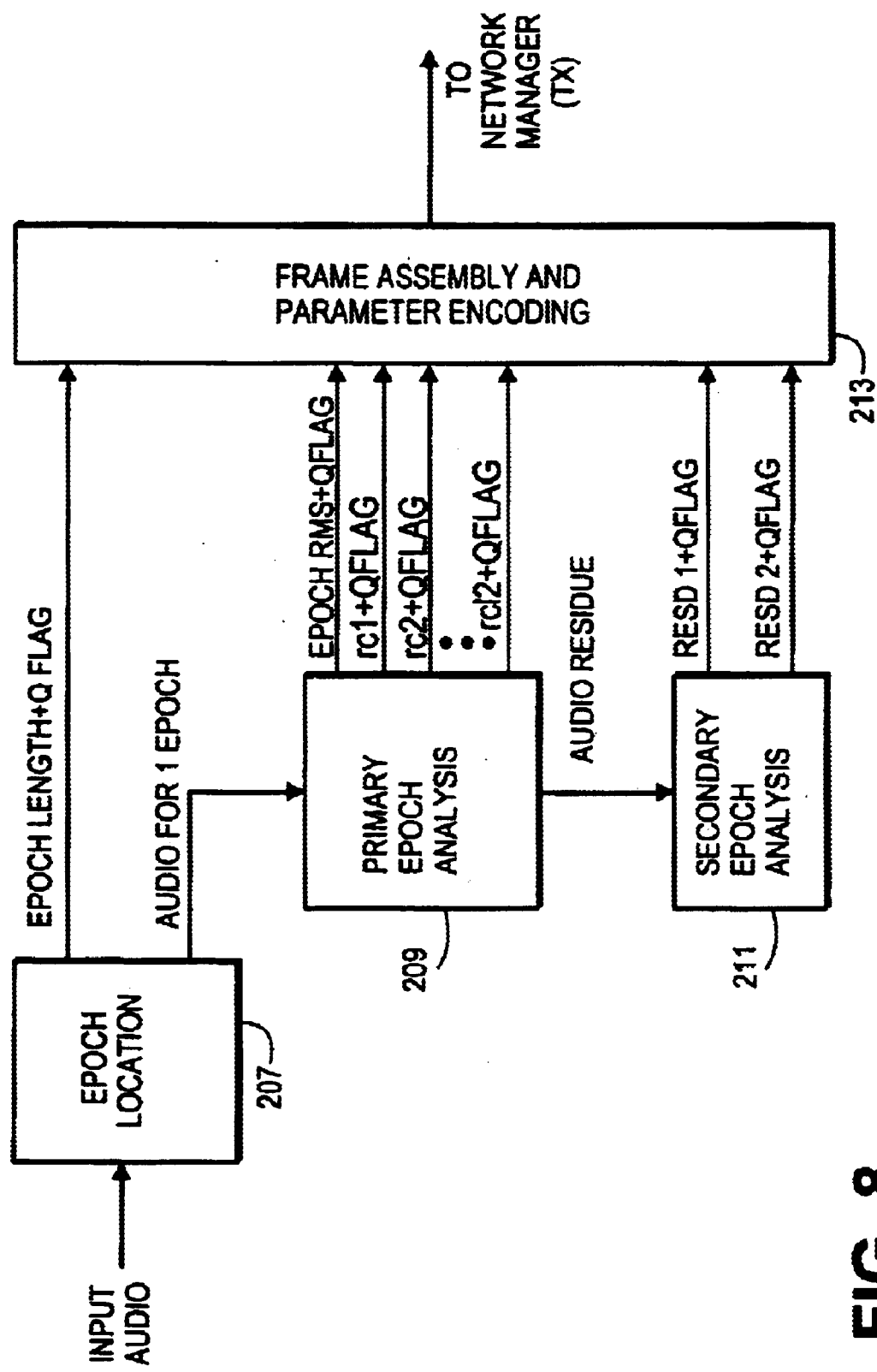
FIG. 8 illustrates an encoding process of an embodiment of the invention to compress a single channel.

Briefly, however, this technique enables speech to be compressed by using a method that results in variable data rates. As illustrated in FIG. 8, when encoding (compressing) a given channel, frames of output (channel) data appear at a variable rate that is determined by activity in the input audio signal. Each frame of data sent to network manager 61 (illustrated in FIG. 3a) comprises 21 parameters describing an epoch (segment) of the input audio signal, an RMS value, 1 to 12 reflection coefficients, and two residue values.

As illustrated in FIG. 8, incoming audio is segmented into epochs at location 207. The epoch segmentation is processed using a time domain pitch tracking technique in the manner described in U.S. Pat. No. 4,980,917 issued to Hutchins. The epoch length is the most important parameter sent to the channel and is assigned a quality flag giving it the highest priority. Each epoch is subjected to a known linear predictive coding adaptable rate voice compression (ARVC) analysis 209 that produces an RMS value (signal energy estimate) and 1 to 12 reflection coefficients (RCs) describing spectral structure of the epoch. The quality flags associated with these coefficients are determined by analysis of trends and changes in their values from frame to frame. The secondary analysis of epoch 211 is performed by using the reflection coefficients to construct an inverse filter. This filter is applied to the input audio epoch to obtain an excitation residue. This residue is further analyzed to derive two residue descriptor parameters. In one embodiment, the residue descriptors have the least influence on reconstructed speech quality and are assigned appropriate quality flags.

As further illustrated in FIG. 8, in one embodiment the parameters are ordered at encoder 213 from most important to least important in their influence on perceived speech quality and a quality flag is associated with each parameter detailing its importance in the current audio context for reconstructed speech audio quality. The quality flags are not sent to the receiving end, but are used in network manager 61 (illustrated in FIG. 3a) to reduce bandwidth with minimal impact on speech quality.

Figure 9:
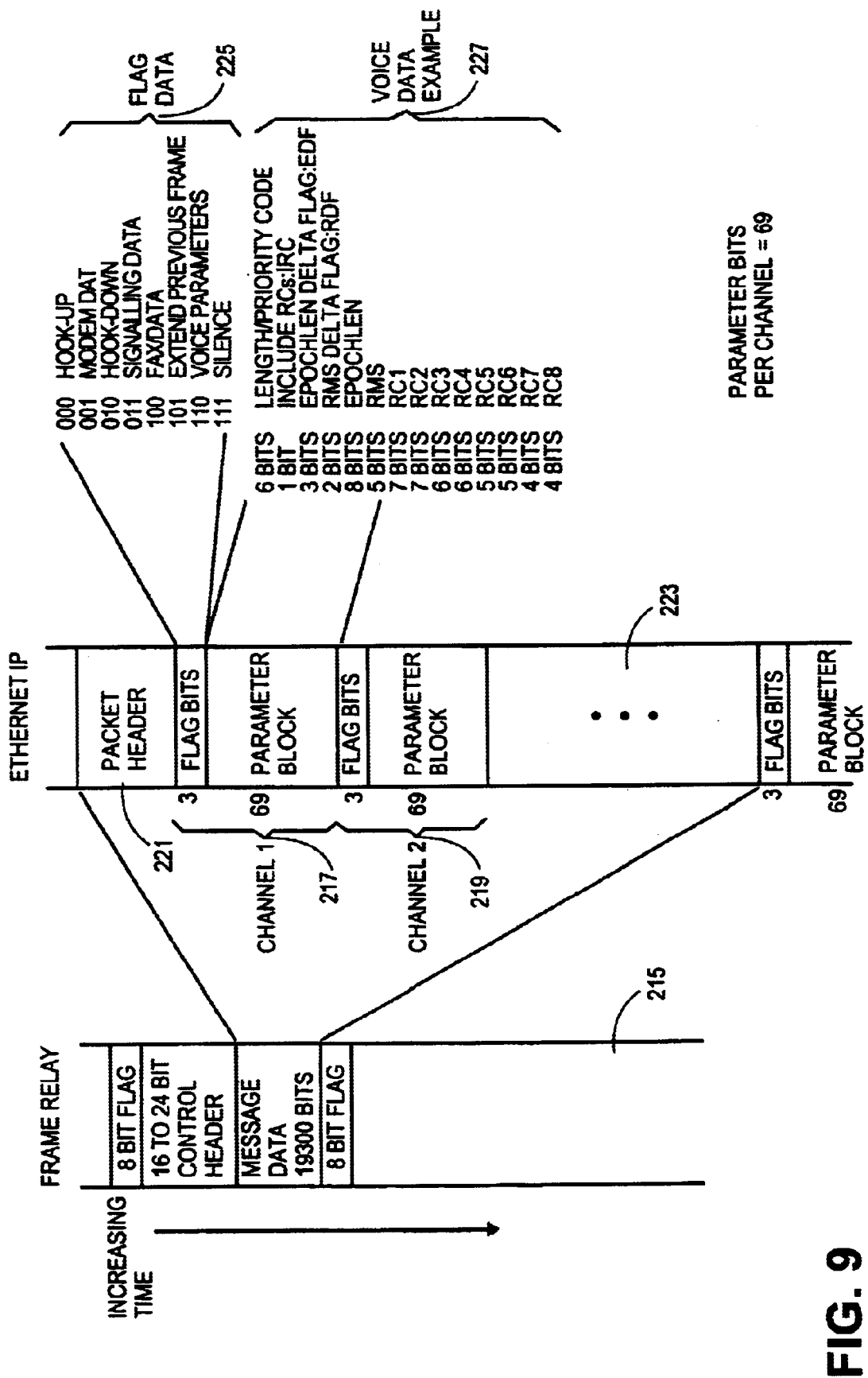
FIG. 9 illustrates packeting information for a frame relay message block during voice data transmission.

FIG. 9 illustrates frame relay format 215 and Ethernet IP format 223 for the case where no voice parameters are eliminated. The parameters shown in example 227 are transmitted. When priorities or bandwidth limitations exist, a subset of these parameters are transmitted thus reducing the total number of bits per parameter block 217.

Packetizing Information for the Frame Relay

In one embodiment network manager 61 attaches the IP header required to identify the IP destination of the packet in Ethernet format 187 (illustrated in FIG. 6). The Ethernet formatted packet is then sent to high-speed router 105 where it is converted to frame relay format 185 and transmitted to destination telecommunication apparatus 4 illustrated in FIG. 3b through frame relay cloud 107. Destination router 109 receives the frame relay packet and converts it to Ethernet format for routing to destination network manager 111. Destination network manager 111 disassembles the packet for routing to the appropriate channel.

Receiving Fax/Data or Modem Data

If the information received is FAX/DATA, in one embodiment destination network manager 111 transfers the data packet to FAX/DATA handler 115. Handler 115 de-compresses the data using V.42bis and transfers it to FAX/DATA generator 129. Generator 129 re-modulates the data to fit the required FAX/DATA format and inserts the resulting signal into appropriate TDM slot location 121 for a particular one of T1 PSTN lines 157.

Figure 10:
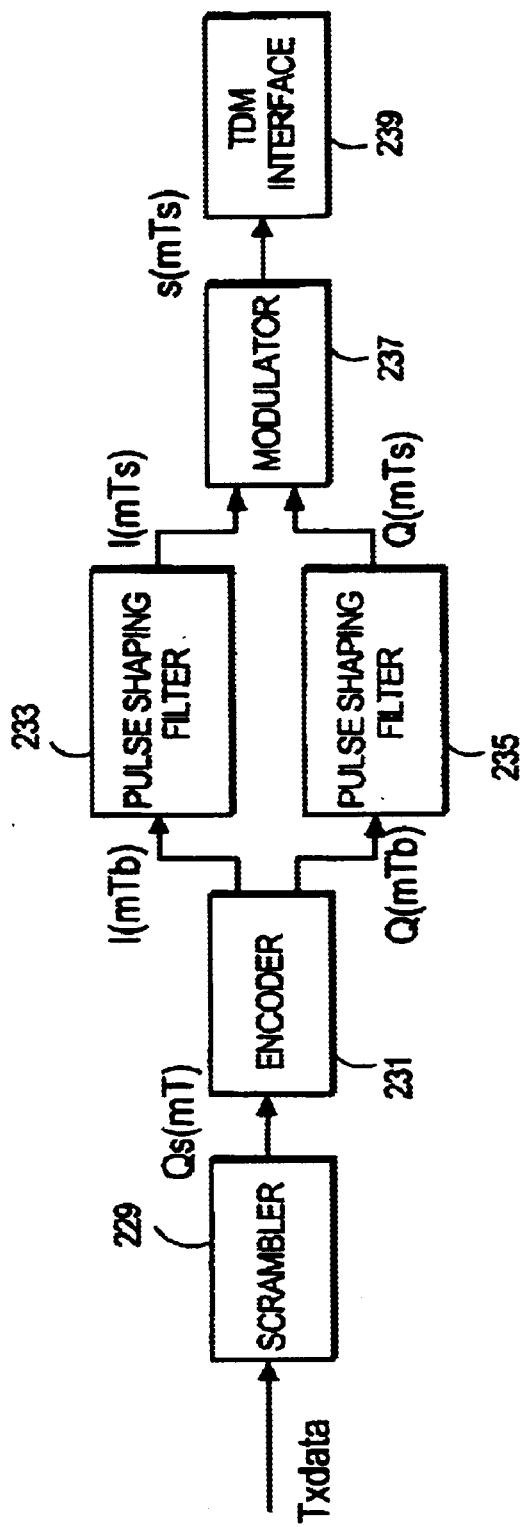
FIG. 10 illustrates a FAX/DATA remodulation technique of an embodiment of the invention to fit decompressed data in a FAX/DATA format.

FIG. 10 illustrates a re-modulation process. Data from the V.42bis de-compression process is scrambled by scrambler 229 and re-encoded according to the particular FAX/DATA format being used. The encoded data is then split into I and Q bit streams by encoder 231, pulse shaped to structure the spectrum by pulse shaping filters 233 and 235 and modulated at modulator 237 according to the particular format being used. The TDM interface routes the re-modulated signal to TDM MUX 121 during the appropriate time slot. CSU/DSU 155 provides the appropriate interface to the PSTN T1 lines thus eliminating the requirement for external equipment for this purpose.

If the information received is modem data, a similar operation to the FAX/DATA mode takes place involving modem data handler 125 and modem data generator 133. The difference between FAX and modem data handling is the timing and encoding structure.

Responding to Fax/Data or Modem

Figure 7:
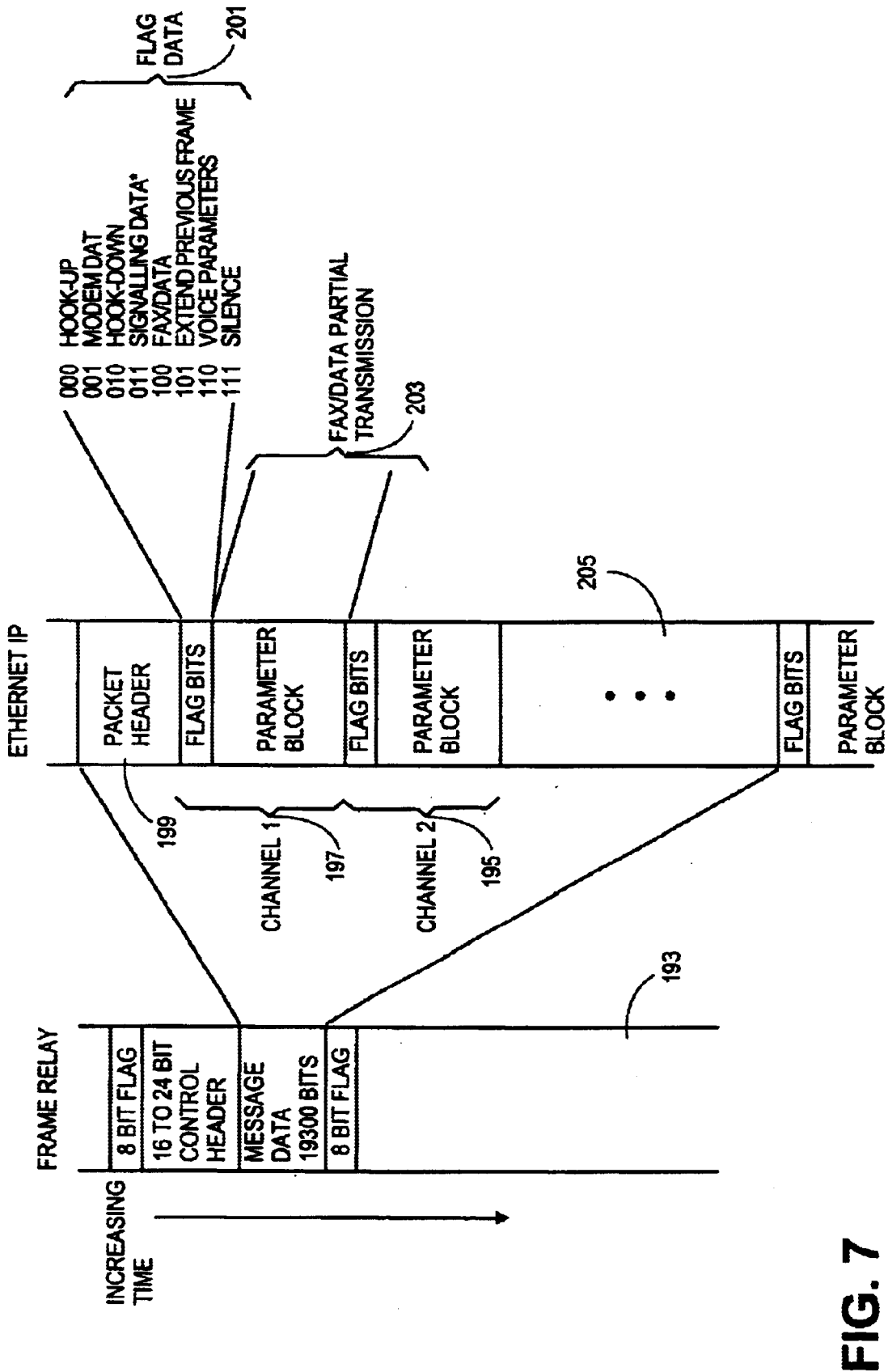
FIG. 7 illustrates packeting information for a frame relay message block during FAX/DATA transmission.

When FAX/DATA and modem information is being sent, traffic is typically one direction at a time. During FAX operation, only response codes are sent back from the destination T1/E1 channel. The response is received by CSU/DSU interface 155 and routed to TDM DEMUX 139 where the particular channel signal associated with the terminated FAX is disassembled and routed to FAX/DATA processor 149 or 153. The FAX/DATA processor demodulates the signal to obtain the data being sent. FIG. 7 illustrates frame relay packet 193 and Ethernet IP packet 205. FIG. 7 is similar to FIG. 6, however parameter block 203 in FIG. 7 is used for FAX/DATA partial transmission. Whereas parameter block 189 in FIG. 6 is used for signaling/call data. The data is compressed by FAX/DATA handler 141 or 145 using V.42bis and transferred to network manager 111 for insertion into an Ethernet IP packet. IP packet 203 illustrated in FIG. 7 is then transferred to high-speed router 109 where it is converted to frame relay format and sent through frame relay cloud 107. The packet is received at destination router 105 and transferred to call origination network manager 61. Origination network manager 61 updates the service queue noting a response from a FAX/DATA operation has been received for the particular channel and transfers the response to FAX/DATA handler 93 or 97 for de-compression. The decompressed data is sent to FAX/DATA generator 89 where signals are generated according to the type of FAX being processed. The signals are inserted into the appropriate channel slot by TDM MUX 85 where it is sent to the T1/E1 channel that originated the call thus completing the entire send and receive path.

In one embodiment when the call is complete, the destination end of the call goes to hook-down status. The hook-down status is sent to origination network manager 61 when the hook-down code is inserted in the packet channel flag (code=010) by destination network manager 111. When the origination network manager receives this code for a particular channel, it updates the service queue to indicate that the call is complete and transfers the corresponding signaling to the origination T1/E1 channel via signaling generator 91, DTMF generator 87, TDM MUX 85, and CSU/DSU interface 59.

Receiving Voice Data

In one embodiment, at destination telecommunication apparatus 4 illustrated in FIG. 3b, network manager 111 reconstructs each frame of typically 21 parameters for each channel, flags the parameters that are missing (i.e. were not sent due to bandwidth limitations over the frame relay link) and transfers the frame to the appropriate voice compression decoder 123.

The parameters are transferred to voice compression decoder 123. The detailed operation of the voice compression decoder is provided in the previously mentioned copending patent application entitled VARIABLE RATE SPEECH DATA COMPRESSION Ser. No. 09/759,734, filed on Jan. 12, 2001.

Figure 11:
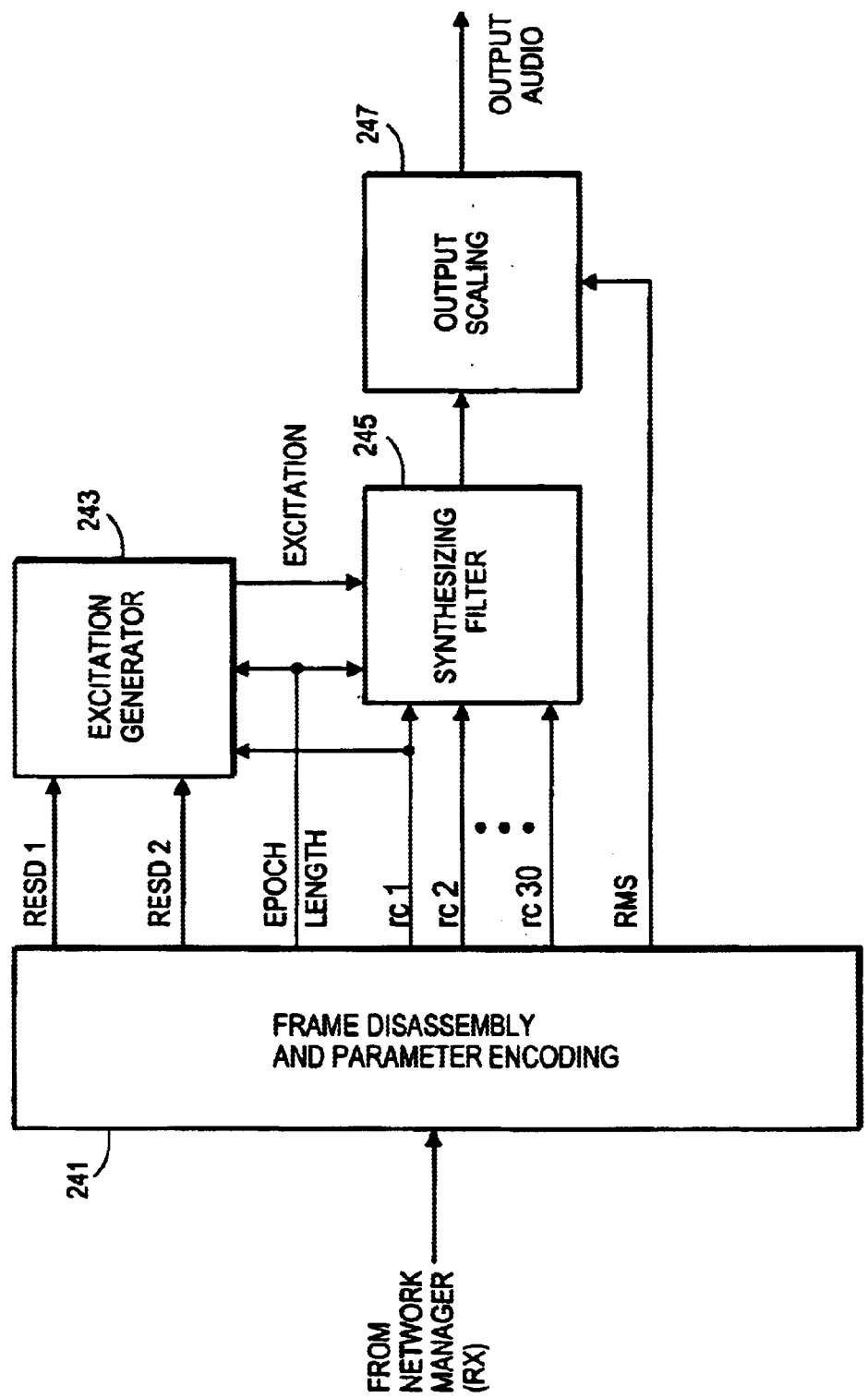
FIG. 11 illustrates a voice compression decoding process of an embodiment of the invention for a single channel.

FIG. 11 illustrates the top-level operation of the decoder. In one embodiment the residue is estimated (reconstructed) by excitation generator 243 using the epoch length and the two residue descriptor parameters from decoder 241. In one embodiment, in the case in which the residue descriptors are not sent over the channel, excitation generator 243 creates an artificial excitation derived from observation of the epoch length history and the first reflection coefficient. The excitation is used to drive synthesizing filter 245, which is spectrally configured by converting the ten reflection coefficients to predictor coefficients by means of a known conversion technique. The output of the synthesizing filter is scaled by output scaler 247 to produce an output epoch with appropriate rms (energy).

The output of synthesizing filter 245 is buffered by voice data handler 131 illustrated in FIG. 3b and samples are stored until they are systematically inserted into the appropriate TDM MUX slot locations. The corresponding T1/E1 frames are routed to the appropriate lines for interface to the PSTN.

Voice Data From Destination Source

When the speaker at the destination T1/E1 channel sounds, the reverse voice data process takes place involving TDM DEMUX 139, voice data handler 151, voice compression encoder 143, destination network manager 111, high speed routers 109 and 105, origination network manager 61, origination voice compression decoder 99, voice data handler 103, origination TDM MUX 85, and origination CSU/DSU 59. This voice data compression/sending and decompression/receiving process continues until the destination channel indicates a hook-down, after which the call is made in-active, the service queue is updated, and the call is set to "complete status".

Configuration Manager

Proper operation of one embodiment of the telecommunication apparatus requires setup information from the user. This setup information is shared by the various software applications and is collected and stored by the system controller. The setup parameters required by the telecommunication apparatus is listed in Table 1 below. More particularly, Table 1 provides an example of the configuration queue that is associated with the network manager illustrated in FIGS. 3a and 3b in which data is stored that is associated with specific T1 or E1 lines.

TABLE 1

| | | |
|---|---|---|
| S1) | T1 or E1 Operation | Default(T1) |
| S2) | Number of T1/E1 (1 to 11) | Default(11) |
| S3) | Number of channels (24/30 to 264/330) | Default(256/300) |
| S4) | QOS Enabled (yes/no) | Default(no) |
| S5) | Max Voice Compression Ratio (15–40) | Default(25) |
| S6) | FAX/DATA Priority (1 to 15) | Default(3) |
| S7) | Modem Data Priority (1 to 15) | Default(3) |
| S8) | Signaling Data Priority (1 to 15) | Default(3) |
| S9) | Message Packet Length (1 to 65,000 bits) | Default(19,300) |
| S10) | DSP to T1/E1 Line association | Default: |

TABLE 1-continued

| Line # | | DSP # |
|---|---|---|
| 1 | | 1 |
| 2 | | 2 |
| 3 | | 3 |
| N | | N |
| S11) | Diagnostics Enabled (yes/no) | Default(no) |
| S12) | Remote Access Enabled (yes/no) | Default(no) |
| S13) | Frame Relay IP Address (source) | Set by User |
| S14) | Frame Relay IP Address (destinations) | Set by User |
| S15) | Remote Access IP Address | Set By User |
| S16) | Router IP Address (source) | Set by User |
| S17) | Signaling Mode (Robbed bit, CAS, CCS) | Default(CAS) |
| S18) | SS7 Signaling Enabled (yes/no) | Default(no) |
| S19) | SS7 Country Variant | Set by User |
| S20) | Call Logging Format | Set by User |
| S21) | Echo Cancellation Enabled (yes/no) | Default(yes) |

In one embodiment the setup parameters are either collected using the built in setup wizard or manually input from the configuration setup menu. A brief explanation of each parameter follows:

The selection of whether the apparatus interfaces to T1 or E1 lines is done by S1. S2 provides the system controller the number of T1/E1 lines that will be connected to the apparatus. S3 provides information about the maximum number of channels that will be inserted into a transmit or receive frame relay message pack.

S4 enables or disables quality of service operation (QoS). If QoS is enabled, a user specified priority of service must be assigned to each channel. QoS is used to guarantee a channel a higher or lower probability of being sent in every packet when required and overrules all dynamically set priorities imposed by the network manager.

S5 allows selection of the maximum voice compression ratio used in the system. The higher the compression ratio, the lower the quality, where quality is measured by ITU standard P.861.

S6, S7, and S8 set the priority associated with FAX/DATA, modem data, and signaling data respectively. The priority associated with S8 (signaling) will determine the latency time required to initiate and make active a call. S9 sets the length of the frame relay message block used for the transmit and receive packets. The maximum message packet length is usually a function of what is allowed by a particular frame relay carrier.

S10 is the mapping of the apparatus input lines to the particular DSP processing the voice channel data. Normal operation provides a one-to-one mapping between the lines and the DSP processors. However, the user can manually decide which DSP processes the voice channels.

S11 enables or disables automatic execution of built in diagnostic routines. The routines run in the background to provide periodic checks of system readiness status.

S12 enables or disables remote operation. The operator of the apparatus is not required to be in the same proximity as the apparatus.

S13 and S14 provide the IP addresses for the source and destination points on the frame relay gateway. These IP addresses can be dynamically changed to provide re-routing per a user's requirements. Setting S13 and S14 can be done from a remote site. S15 is the IP address of the remote access server and cannot be changed dynamically. The remote access server provides a method of controlling the device from any PC that interfaces with the Internet or the frame relay network associated with the apparatus. S16 is the router IP address and is required for proper frame relay operation. This IP is furnished by the frame relay carrier. S17 sets the signaling mode used by the apparatus to interpret channel-signaling data. S18 enables SS7 signaling and S19 selects the country variant employed by the apparatus.

S20 selects the call logging format used to store the records associated with each call. This data is made available for download to a processing site. The information is used for billing and line utilization analysis.

S21 enables or disable echo cancellation. Echo cancellation is required when voice compression is used. The local echo loop causes degraded operation of the voice channels at the call termination apparatus.

Network Manager

The operation of the disclosed telecommunication apparatus is based on an implementation of the telecommunication methods disclosed in the aforementioned copending patent application in conjunction with the network manager techniques of this invention. The two techniques are symbiotic and yield the operational results disclosed herein. In this regard, provided below is a detailed description of the network manager and its relationship to the telecommunication methods.

In one embodiment the purpose of the network manager (e.g. designated 61 and 111 in FIGS. 3a and 3b) is to determine which data is inserted in the output frame relay packet and to disassemble the data that is extracted from the input frame relay packet. The network manager assembles the output packet based on the available frame relay bandwidth capabilities, QoS settings, and priority settings from the voice compression process.

There are three primary queues associated with the network manager. One queue holds the unedited data from the processed voice channels, the channel signaling data, buffered data from channels containing FAX/DATA or modem data, and general control flags. This queue is referred to as the network packing queue. The second queue holds the status of calls on a channel basis and is referred to as the service queue. A third queue involved in the network management process is the configuration queue which holds the data associated with the T1/E1 lines connected to the apparatus. The network manager makes decisions on which data is inserted into the output packet based on information contained within these three queues.

Figure 12:
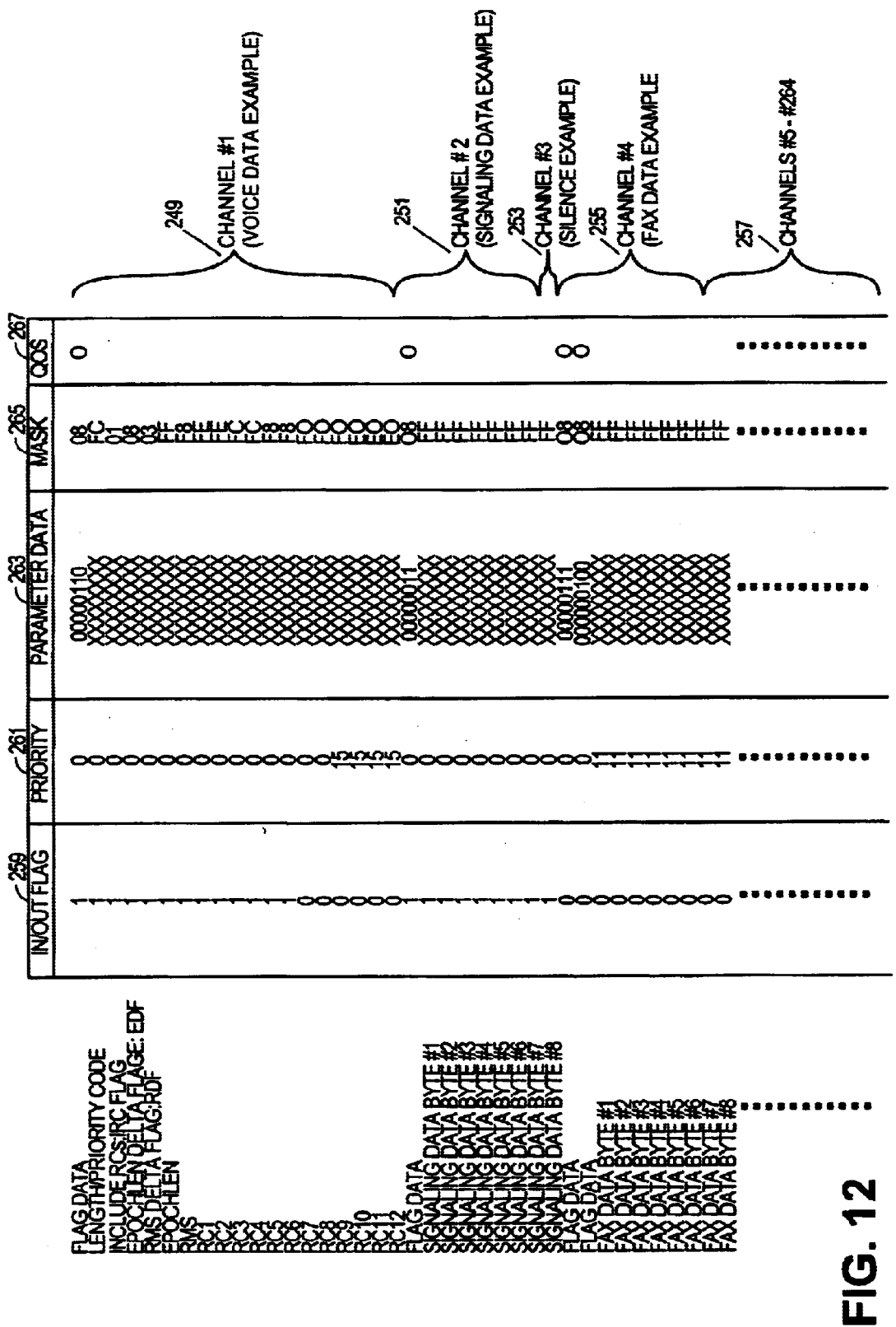
FIG. 12 illustrates a network packing queue associated with a network manager of FIGS. 3a and 3b containing parameter data.

FIG. 12 illustrates a network packing queue. The queue is basically an array containing parameter data 263, priority 261 associated with that parameter, QoS settings 267, an in/out flag 259, and mask 265 that indicates the number of parameter bits to be transmitted. The packing queue parameter data 263 is the unedited parameters from the respective sources (designated signaling detection 81, FAX/DATA handler 79, voice compression encoder 73, or modem data handler 71 in FIG. 3a). Priority setting 261 is the priority associated with each voice parameter that was determined by voice compression encoder 73. These priorities change as a function of the influence the parameter has on the voice quality reproduced at the receiver. Static priorities are set for signaling data, FAX/DATA and modem data during initial apparatus configuration. Mask 265 is set according to how many bits of the parameter data are to be transmitted. QoS setting 267 is a priority parameter that overrides all other priority settings associated with a particular channel. QoS is set during client services initialization procedure. The default case is that all channels have the same QoS. QoS and priority settings have the same rating scale, namely, a priority and QoS level 0 is the highest priority and level 15 is the lowest. The in/out tag 259 is set by the network manager indicating whether the associated parameter is included or deleted (1=included; 0=deleted) from the transmitted packet. FIG. 12 illustrates examples of voice channel data 249, signaling data 251, unused channel 253 and FAX/DATA channel 255. For the sake of convenience, channels 5 to 264 are represented by continuation 257.

FIG. 13 illustrates a network service queue. This queue is also an array containing call status information on a channel basis. The service queue tracks activity by recording origin hook-up 271, destination hook-up 273, call start connect time 275 (indicated when both origin and destination hooks are up), stop connect time 277 (indicated when origin or destination hook-down occurs), call mode 279 (V-voice, S-signaling, F-Fax, M-modem), call number 281 (number dialed), and sig data information 283 (information about signaling mode). The network service queue is handled on a channel basis. When a call for a particular channel is complete, the service queue data relating to the call is transferred to a call logging file. An internal timer is attached to each active channel in the service queue. This timer prevents the channel from being locked in the case of error conditions or a defective link.

The configuration queue stores data associated with the specific T1 or E1 lines connected to the apparatus. Table 1, listed above, illustrates the information collected by the network manager during initialization and setup. In one embodiment a setup wizard is included with the apparatus to aid in configuration setup.

As previously described, the network manager illustrated in FIGS. 3a and 3b splits the bandwidth of the frame relay gateway between the transmit and receive operations. Assuming a fixed gateway bit rate, a fixed bit count is assigned to both the transmit packet and the receive packet. For T1 frame relay gateway operations, in one embodiment 19,300 bits are assigned to each packet of which approximately 50 bits are designated for control of each packet. It is the task of the network manager to allocate these bits on a channel basis thus optimizing utilization of the gateway bandwidth. The allocation goal is to maximize voice reproduction quality at the call termination apparatus.

Figure 14A:
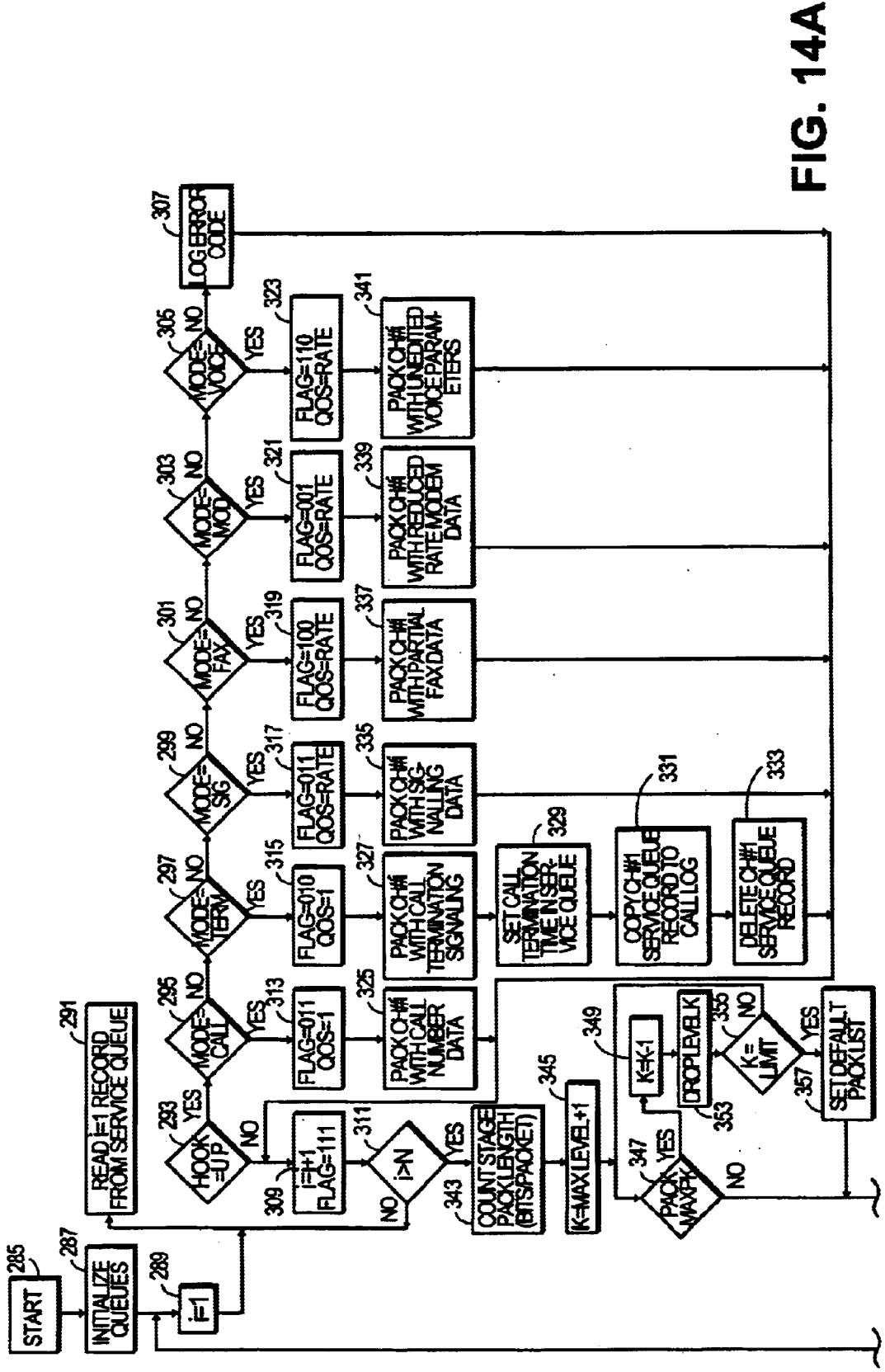
FIGS. 14a and 14b illustrate a flow diagram for the network manager illustrated in FIGS. 3a and 3b.
Figure 14B:
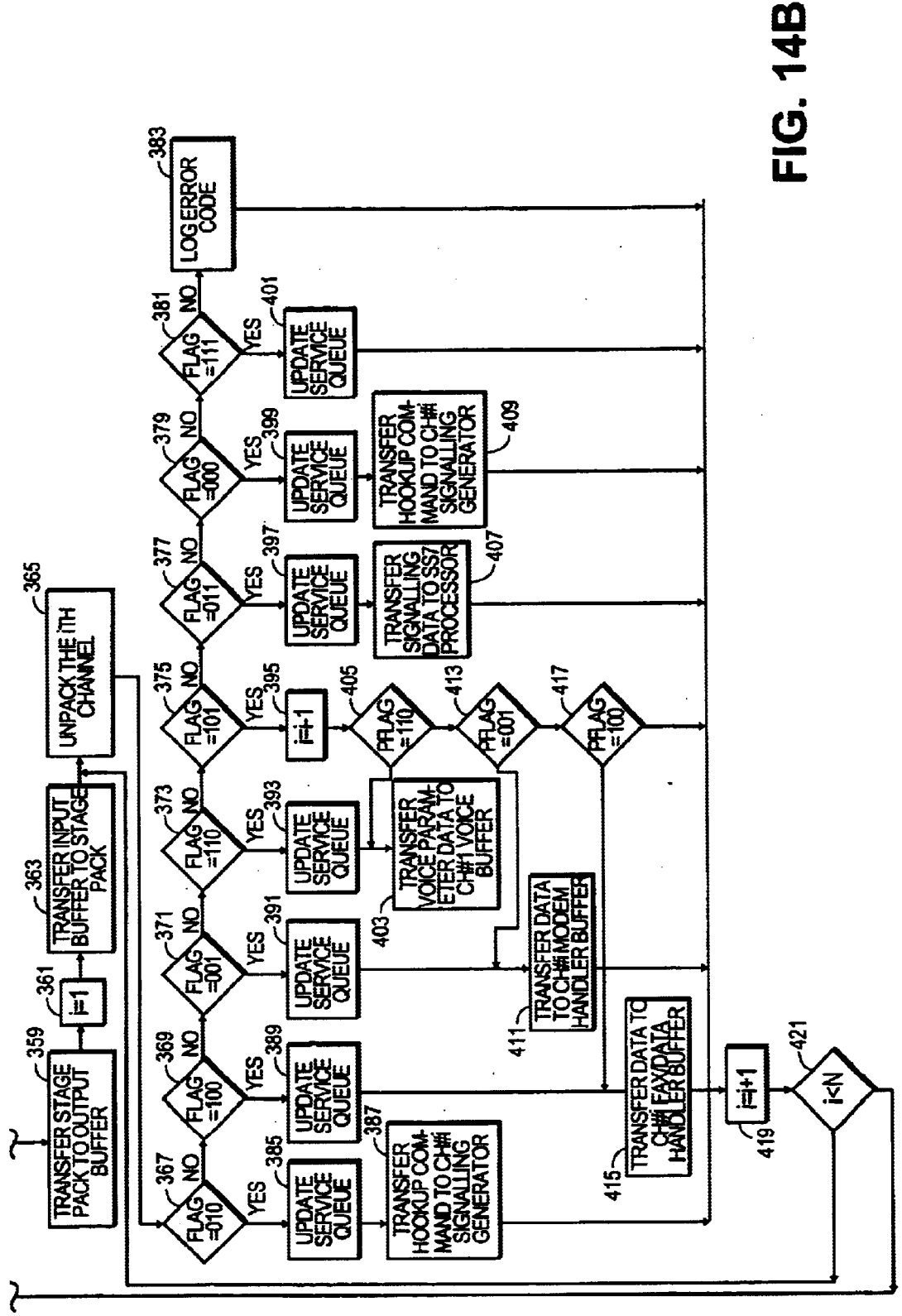

FIGS. 14a and 14b illustrate a network manager flow diagram. The following description is based on the call origination apparatus. Network manager operations begin during equipment start-up 285 and continue through shutdown. At start-up, all queues associated with the network manager are initialized at queue initialization 287 to zero. Tracking counters 289 are preset and normal operations begin. The network manager reads a first record (channel #1) at operation 291 in the service queue.

If this first record indicates a call in process (Hook-up@Origin=True) during operation 293, the network manager proceeds to determine what action is required at operation 295. If the action at 295 is make call, as indicated by the detection of signaling tones by the signaling detector (designated 81 in FIG. 3a), in one embodiment the network manager sets the flag data in the packing queue illustrated in FIG. 12 to (011), sets QoS to 1, and inserts the call number information into the appropriate channel parameter block. If the action is to terminate the call (hook-down) at operation 297, in one embodiment flag data is set during operation 315 to (010), termination signaling data is inserted into the channel parameter block at operation 327, the origin and destination flags 271 and 273 of the service queue illustrated in FIG. 12 are set to 0, the call termination time is inserted into the call record at operation 329, the corresponding call record is transferred to the call log at operation 331 and then deleted from the service queue during operation 333.

In one embodiment if the action is to send signaling information during operation 299 (Signaling Mode=True), flag data is set to (011), QoS is set during operation 317, and the signaling data is inserted into the channel parameter block at operation 335. If the action is to send FAX data during operation 301 (FAX Mode=True), flag data is set to 100, QoS is set during operation 319, and eight bytes of FAX data is inserted into the channel parameter block at operation 337. If the action is to send modem data 303 (Modem Mode=True), flag data is set to 001, QoS is set during operation 327, and eight bytes of modem data is inserted into the channel parameter block at operation 339. In one embodiment if the action is to send voice data during operation 305 (Voice Mode=True), flag data is set to 110, QoS is set during operation 323, and fourteen bytes of voice parameters are packed into eight bytes and inserted into channel parameter block at operation 341.

However, if none of the above actions are indicated, an error condition exits and is recorded in the error log file during operation 307. If a channel is silent (hook-down), the process continues by incrementing the tracking counter, setting the Flag Data to (111) at operation 309 and reading the next record at operation 291 in the service queue. The process continues until all records in the service queue are read at operation 311 after which, the cycle repeats starting with channel #1. The process is complete when the network packing queue illustrated in FIG. 12 has information for all channels even if the channel is silent.

The next operation of the network manager is to determine if the amount of channel data has exceeded the frame relay bandwidth capacity. This is done by counting the number of bits in the packing queue during operation 343. In one embodiment, in the case of a T1 frame relay gateway and a 25 msec update period, the bit count should not exceed 19,300 bits. If this bit count is exceeded, the network manager begins the process of deleting the low priority parameter data during operation 353. After dropping parameters associated with a particular priority level, the bit count is re-tested at operation 355. This process continues during operation 347 until the packet size is below maximum limit (19,300 bits for a T1 frame relay gateway) or the minimum priority limit is reached (after which no further reduction in parameters is allowed). During the process of dropping parameter data, the network manager examines the priority code and the QoS code for each parameter. The QoS code always overrules the priority setting. In the case where QoS codes are not set (use of QoS codes is optionally set during configuration setup), the priority codes control the dropping of parameter data. This technique yields the variable rate nature of the voice compression implementation used in this apparatus. In other words, the effective bit rate associated with each voice channel is a function of the bandwidth available during any 25 msec period. If there is ample bandwidth, all voice parameters are included. If the gateway is crowded (many channels requiring transmission), a reduced set of voice parameters is sent. Hence, the dynamic change in the number of parameters (i.e. bits) included in the packet, gives rise to a variable data rate characteristic of the telecommunication apparatus.

Once the number of bits transmitted is resolved, the network manager prepares the packing queue for transmission as an Ethernet IP packet during operation 359 and enables the serial output transmission from the output buffer. The preceding process is repeated at the system frame rate (processing interval for voice channels).

The network manager not only handles the output packet generation, but also manages the received packet disassembly and service queue updates associated with incoming data. The incoming receive packet data is buffered in a staging area until the entire packet is received during operation 363. The tracking counters are initialized and the disassembly process is started at operation 365. Each received channel is unpacked and its flag data examined to determine what type of information is being received.

If flag data is Hook-down (Flag 010) during operation 367, the service queue is updated (origin/destination set to 0) at operation 385, and the hook-down command is sent to the signaling generator for the associated channel during operation 387. In one embodiment if flag data is FAX/DATA (Flag=100) during operation 369, the service queue is updated (Mode set to F) at operation 389 and eight bytes of FAX/DATA are transferred to the associated channel FAX/DATA handler during operation 415. If Flag Data is modem data (Flag=001) during operation 371, the service queue is updated (Mode set to M) at operation 391 and eight bytes of modem data are transferred to the associated channel modem data handler during operation 411.

If flag data is voice data (Flag=110) during operation 373, the service queue is updated (Mode set to V) at operation 393 and the specified number of bytes of voice parameter data is transferred to the voice buffer of the associated channel during operation 403. The number of voice data bytes transferred is indicated in the first six bits of the associated parameter data. If the flag data is extend previous frame (Flag=101) during operation 375, the service queue is updated (Mode set to previous code) and the channel index decremented by one at operation 395 (which prevents the associated current index from indicating a new channel). Based on the type of data sent in the previous frame, data is transferred to the appropriate handler during operations 405, 413 and 417.

If the flag data is signaling data (Flag=011) during operation 377, the service queue is updated (Mode set to S) at operation 397 and the signaling data is transferred to the SS7 processor or the DTMF signaling generator during operation 407. If the flag data is hook-up (Flag=000) during operation 379, the service queue is updated (origin/destination set to 1) at operation 399 and the hook-up command is sent to the signaling generator during operation 409. If the flag data is silence (Flag=111) during operation 381, the service queue is updated at operation 401 (origin and destination set to 0) and no data is sent to the associated TDM channel.

However, if none of the flag codes are detected, an error code is generated during operation 383 and sent to the error code log file. The preceding process is repeated until all channels are processed (i.e. the received packet is completely disassembled and data routed to their respective handlers) during operations 419 and 421.

Run-Time Manager

In one embodiment the run-time manager starts and monitors all processes taking place in the disclosed apparatus. During startup, the first operation performed by the run-time manager is to run system diagnostics to determine the readiness of the apparatus. If the apparatus fails any one of these diagnostic routines, operation is halted and a report generated. If the apparatus passes all diagnostic routines, the initialization process is started. In one embodiment the initialization process is performed by downloading the application software to all DSPs and associated controllers from their associated files stored on the main controller. This downloading process signals the start of operations of the downloaded software. During normal operations, the run-time manager periodically, on a non-interference basis, runs the automatic diagnostic routines. If the apparatus fails a test, a self-healing mode is initiated. This mode re-allocates operations to those resources that passed the diagnostic test which allows operation to continue, although not to full capacity. In one embodiment the disclosed telecommunication apparatus is implemented with a 30% processing margin that allows for some failures in its resources. Any active process or operation in the apparatus can be halted or started by the run-time manager. This is especially useful during failure analysis.

Remote Access Operation

In one embodiment the disclosed telecommunication apparatus is completely controllable from a remote site. The apparatus main controller contains an Internet information server, such as Microsoft Internet information server (IIS) 4.0, that allows Internet access to resources within the apparatus. Active server page software is included with the apparatus that displays the same information to the user that they would see if directly connected to the apparatus, such as with a monitor, keyboard and mouse.

The remote port of the apparatus is a part of the main controller and has its own IP address. This address is set at configuration startup and cannot be changed. The apparatus can be controlled from any device with access to the Internet, such as a PC, or the frame relay gateway on which the apparatus is connected. In the case of Internet access, the main controller must be connected to the backbone through an ISP and their associated domain name server (DNS). If the apparatus gateway is accessible remotely, a device such as a PC connected to this gateway can control the apparatus.

To avoid tampering of the apparatus operations, very strong security measures are incorporated within IIS 4.0. Usernames and passwords and user authorization records within the apparatus are required. Microsoft Windows NT 4.0 security must also be satisfied for valid remote operation.

Hardware

An example of one embodiment's hardware implementation of the disclosed telecommunication apparatus is now presented. This description applies to a channel voice compression unit having at least 256 channels and configured for eleven T1 or E1 fixed line general telephony operation (hereinafter referred to as VCU_256). The implementation techniques described in this example are scalable to larger and smaller systems including T3/E3 networks, optical fiber cables, and microwave links.

Figure 15:
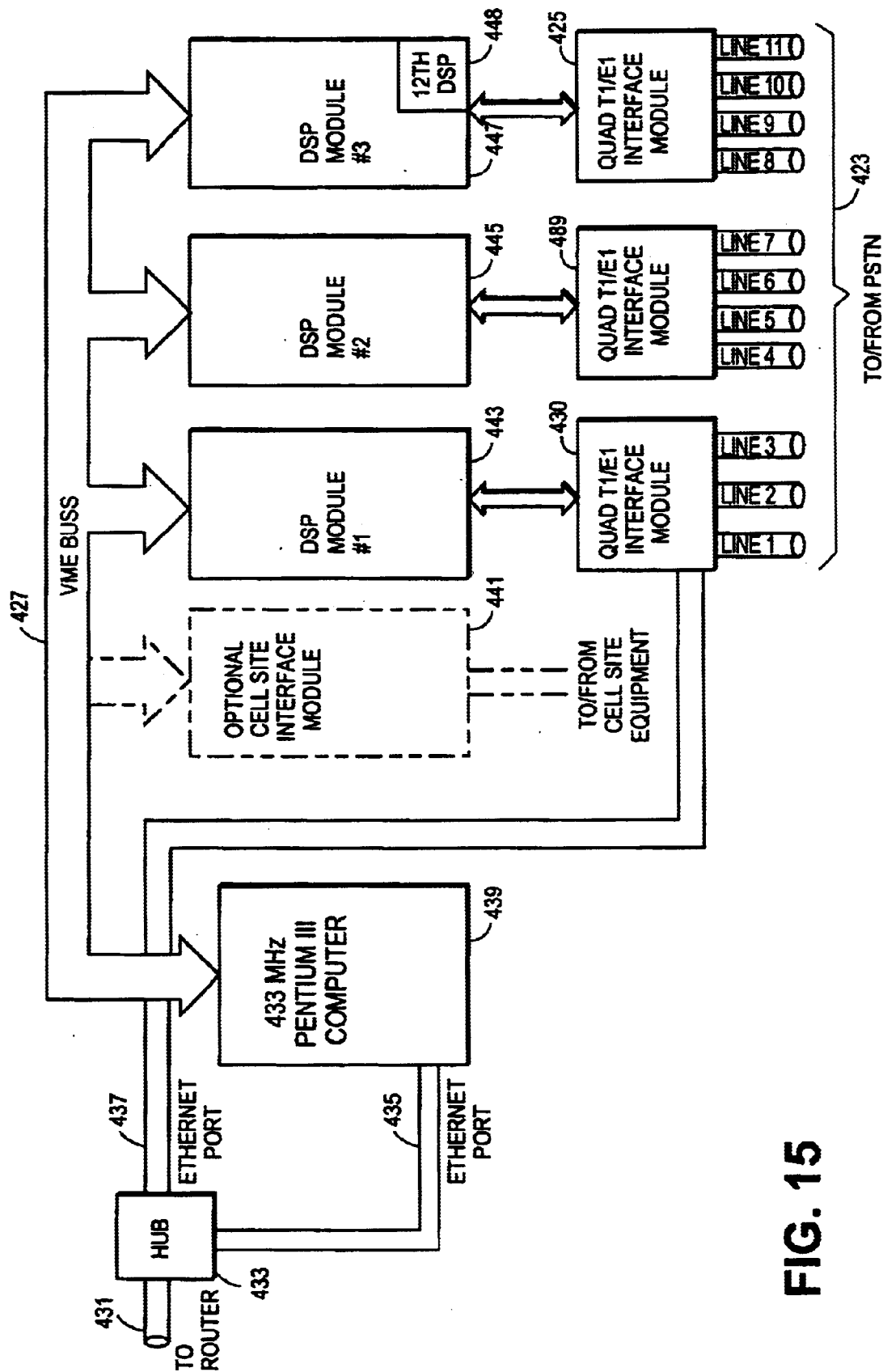
FIG. 15 illustrates a block diagram of an embodiment of the invention configured to fixed line general telephone operation.

One embodiment implements telecommunication methods through the programming of multiple DSPs and a PC based controller. FIG. 15 illustrates the system hardware architecture as it applies to an apparatus for T1 or E1 frame relay gateways. The software architecture of one embodiment of this apparatus was previously described when referring to FIG. 4.

In one embodiment the T1/E1 interface bank consists of commercially available DSP based modules that implement standard ITU specifications for lines of this type. The configuration of one embodiment requires three T1/E1 interface modules 425, 429 and 430 to connect to eleven T1 or E1 PSTN lines 423. The DSP module bank consists of commercially available TMS320C6201 chips packaged in a quad configuration on virtual machine environment (VME) 6U modules. Three quad modules 443, 445 and 447 are used in this embodiment thus requiring twelve TMS320C6201 DSP chips. Each of eleven of the DSP chips process 24 or 30 full-duplex voice channels thus providing 264 channel capacity for a T1 based configuration and 330 channel capacity for an E1 configuration. The twelfth DSP chip 448 implements the network manager previously described in this disclosure (and illustrated in FIGS. 3a and 3b).

FIG. 15 illustrates an embodiment including (but not limited to) a 430 MHz Pentium 6U VME computer 439. This embodiment provides system configuration control, system performance monitoring, system diagnostics, and graphical user interface (GUI). Additionally, computer 439 provides a remote interface to the GUI over a wide area network (WAN) or Internet protocol (IP) based digital subscriber line (DSL), integrated services digital network (ISDN), or frame relay interface through Ethernet port 435. In one embodiment the operating system of computer 439 is Microsoft Windows New Technology (NT) 4.0. IIS 4.0, simple network management protocol (SNMP) or network monitoring server. IIS 4.0 and SNMP are Microsoft products that accompany Windows NT 4.0 Server in Option Pack 4.0.

Figure 17:
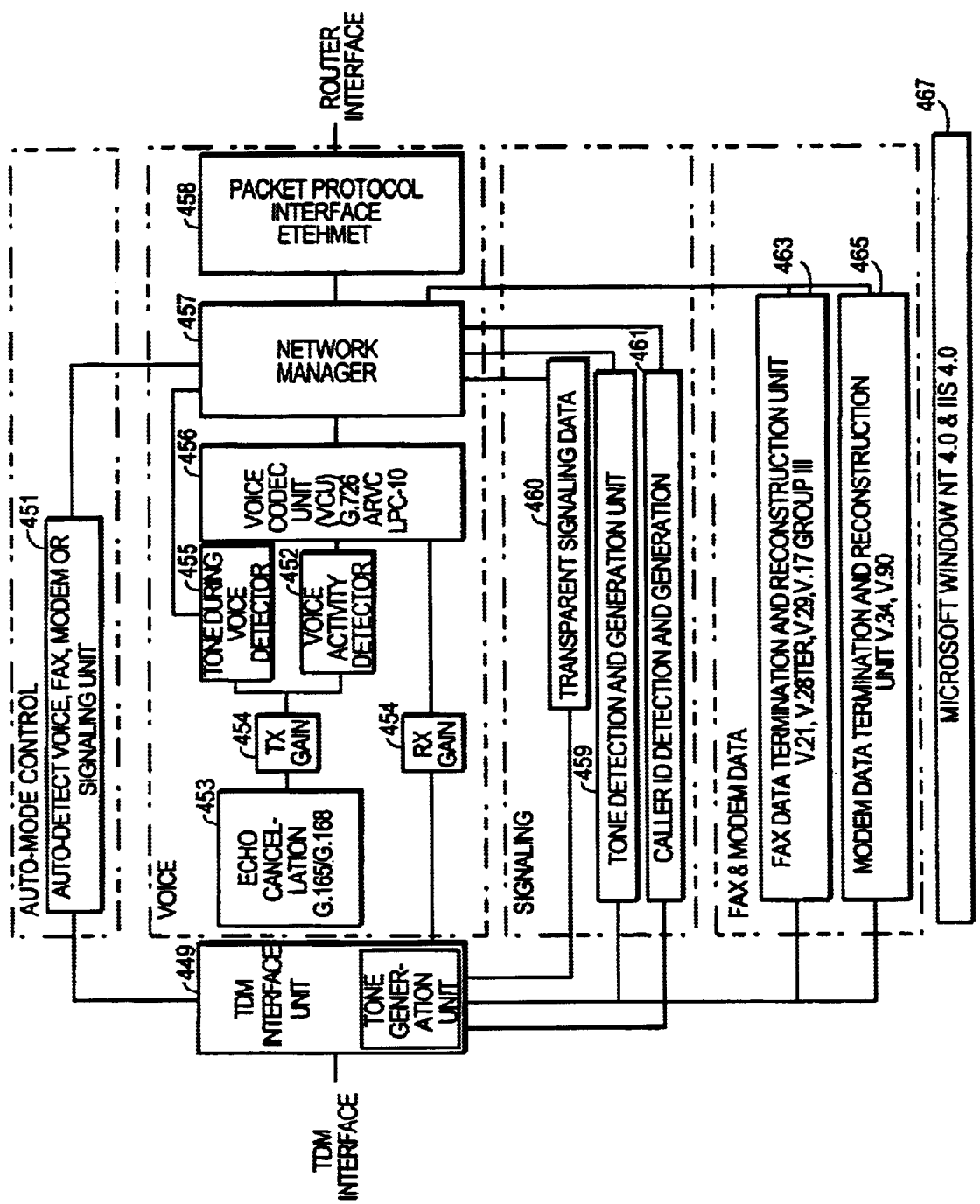
FIG. 17 illustrates a software architecture of an embodiment of the invention.

Telecommunication methods are implemented in the apparatus through software programming of the various DSP module chips 443, 445 and 447 and computer chip 439. FIG. 17 illustrates a top-level software architecture for the application programs running on the system. In one embodiment the application software currently associated with this apparatus is either Visual Basic, Visual Script or C++ code, although other application software may become available.

As illustrated in FIG. 17, the apparatus software architecture is shown divided into four functional areas (i.e. auto-mode control, voice, signaling, and FAX and modem data). Auto-mode control 451 monitors the channel slot data recovered by TDM interface unit 449 for each T1 or E1 lines connected to the apparatus. Auto-mode control 451 determines whether the information being sent or received is signaling, voice, FAX, or modem data and enables processing by the appropriate real-time application software. If the information being sent or received is voice data, the voice signal is sent through echo-canceller 453 (ITU G.165/G.168) to remove handset and system echoes inherent in PSTN type phone networks. The signal is controlled by gain controller 454 by fixed or AGC depending on user configuration settings. Compressed voice data uses fixed gain control to minimize voice quality degradation. A tone during voice detector 455 is incorporated to allow FAX or modem operation to interrupt voice data traffic and switch to the appropriate application software. Voice activity detector 452 and its associated timers enable disconnect during very long periods of silence.

In one embodiment the voice data is compressed/decompressed by voice codec unit 456 using either ITU G.726, ARVC, or LPC-10 DSP based software. Network manager software 457 optimizes the bandwidth utilization of the digital network gateway. Packet protocol interface software 458 is an extension of the network manager and prepares the packets for transmission over the digital network gateway. Signaling software 459, 460, and 461 decodes/encodes the DTMF or SS7 information necessary to operate over a PSTN phone network.

In one embodiment the FAX and modem data is processed by software 463 and 465 that implements a store, compress and forward operation. The FAX and modem application software interfaces with ITU standard formats such as V.21, V.27ter, V.29, V.17 Group III, V.34, and V.90, for compatibility with existing FAX and modem equipment. In one embodiment all real-time software runs on TMS320C6201 DSP chips and host PC 467 is Microsoft Windows NT 4.0 and IIS 4.0 based.

The hardware of this invention provides the vehicle for implementing the disclosed telecommunication methods using commercially available software, such as Visual Basic and C++ programming code. One channel of processing which incorporates all elements of the hardware and software components used in one embodiment will now be described while referring to FIG. 18.

A DSX-1 line 469 from a PSTN is connected to a port on T1/E1 interface module 563 via an RJ45 connector. The T1/E1 interface module detects a 1.544 MHz carrier and phase locks internal clock 481 to this carrier. The phase-locked clock is used to clock in the data associated with each of the 24 receive and 24 transmit time division multiplexed (TDM) eight bit time slots associated with T1 operation. In one embodiment framing bit detection is continuously performed on incoming data looking for a 100011011100 pattern. In the absence of this pattern, a loss of synchronization (RLOS) is indicated which causes an internal crystal based clock to attempt acquisition and obtain frame lock. The frame synchronized data is then buffered by framing process 477 into eight bit bytes for processing by TMS320C52 interface module DSP chips 487. The host computer monitors the detection of the T1 line and sends configuration data to the network manager software described above.

Figure 18:
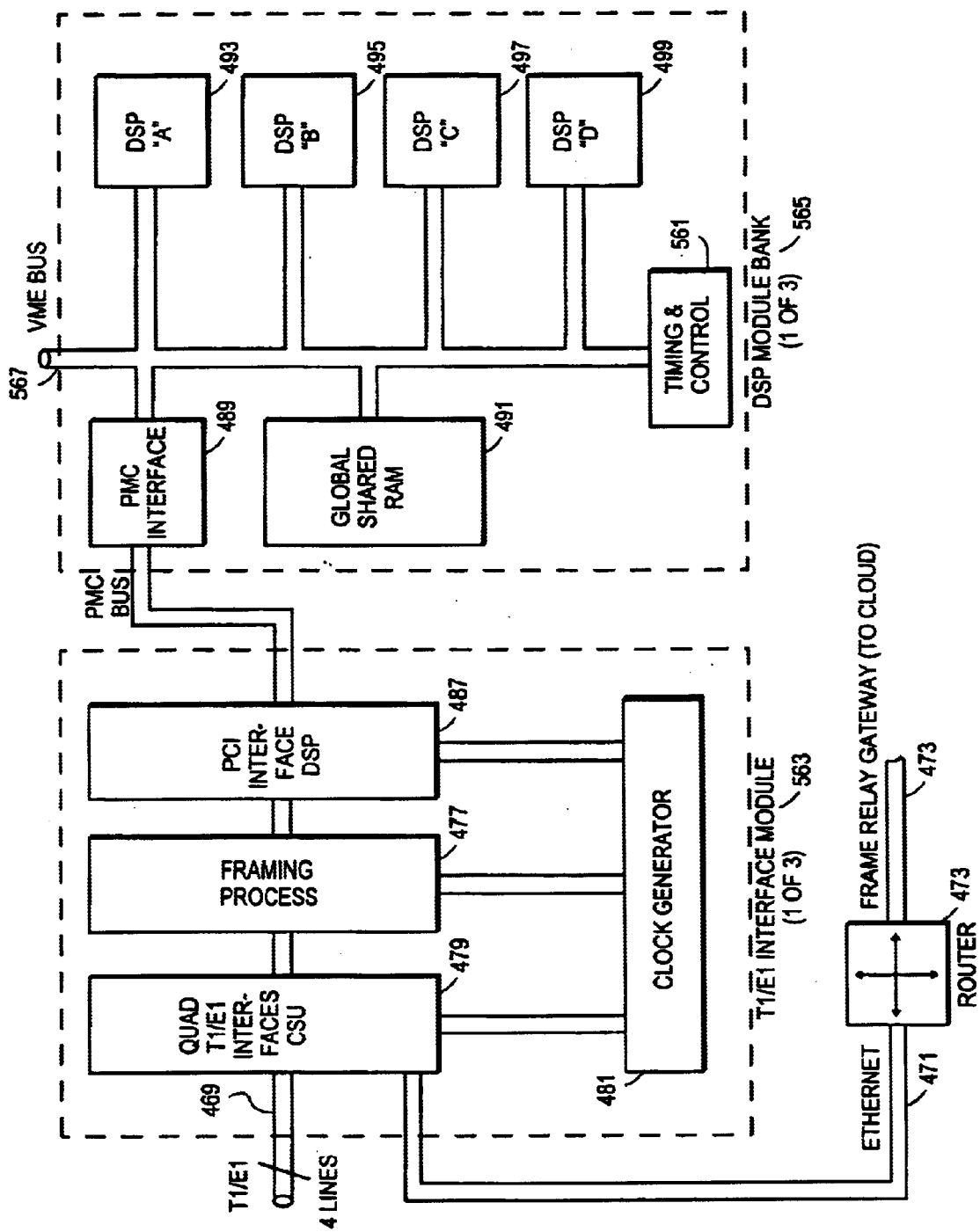
FIG. 18 illustrates a process flow of an embodiment of the invention for one channel.

The interface module DSP software looks for DTMF signaling, which indicates hook-up and call number. FIG. 18 illustrates the signaling and call number information is processed by the DSP chips of interface module 563 which convert the data to byte format for packetizing prior to being included into the frame relay message block. This data is sent to the network manager over VME bus 567. During signaling, the channel data slots of the frame relay message block (designated 610 in FIG. 6) are used for passing signaling and call information to the terminating equipment. Note that 8 bytes can be used to pass the calling number (16 digit number plus signaling). The three-bit flag separators listed below indicate whether the channel data is compressed voice parameters, signaling and/or call number data, silence, or FAX/DATA.

000—Hook-Up
001—Modem Data
010—Hook-Down
011—Signaling and/or Call Number
100—FAX/DATA
101—Extend Previous Frame
110—Voice Parameters
111—Silence In one embodiment, the network manager dynamically generates the message block structure prior to insertion into the frame relay. For ease of discussion, one example uses 200 samples/frame with 64 bit parameter blocks. Using frame relay format for full-duplex operation, the compressed parameter data for each direction must be updated every 12.5 msec. For T1 operation (1.544 Mbps) this equates to 17,370 bits sent in the transmit direction and 17,370 bits sent in the receive direction during a 22.5 msec interval. If each channel has a maximum of 62 bits for compressed parameter data and 2 flag bits, 256 channels will require 16,384 bits each direction for full-duplex operations leaving 986 bits for framing and protocol per packet. Note that during silence on a channel, only three bits are sent, thus on a statistical basis, operation of up to 264 channels on one T1 frame relay gateway is possible. Also note that during peak load periods (all channels utilized) with very little silence, the network manager has the option of sending less than the full parameter set, thus reducing the number of bits required per channel while maintaining at least 256 channel capability.

In one embodiment the channel time slot locations are fixed for both the transmit and receive packets. Assuming channel #1 is being processed, the call number and signaling information is inserted into consecutive transmit packets in the channel #1 position (62 bit segment) with flag bits set to 01 and then sent to high speed router 473 in Ethernet format. The router converts the packet into frame relay format while applying the selected protocol and routing information (IP, IPX, etc.) for transmission over frame relay gateway 475 to the receiver end.

At the receive end, the process is reversed. The packet is received in frame relay format via gateway 475 and converted to Ethernet format by high-speed router 473. The resulting packet is then processed by the network manager where it is converted to byte format and transferred via Ethernet 471 to the T1/E1 interface module 563 where the call number and signaling information is converted back to DTMF format and inserted into the appropriate DSX-1 time slot, (channel #1 in this example) for transmission to the PSTN. If there is an answer (hook-up detection) at the call termination, hook-up signaling is sent back to the calling origin using signaling in the appropriate time slot.

Once the origin and terminating ends of the call are active, signal compression and decompression begins. Voice data from the appropriate DSX-1 time slot, channel #1 in the subject case, is buffered by T1/E1 interface module DSP 483 until 200 samples are available (25 msec of data at 8 KHz sample rate). The 200 samples from a processing frame are transferred to global random access memory (RAM) 491 located on an appropriate DSP board as illustrated in FIG. 18. One should note that other memory components may be used such as, static random access memory (SRAM), dynamic random access memory (DRAM), or synchronous DRAM (SDRAM).

As described previously, in one embodiment there are four DSP chips 493, 495, 497 and 499 on each DSP module on module bank 565 and each DSP is dedicated to processing the voice data from one T1 or E1 line. The software executed on each DSP is capable of processing 24 or 30 voice channels in real-time. Each DSP collects one frame of voice data for each of 24 or 30 channels from global RAM 491 and processes the data using the method described in the above-identified commonly owned copending patent application. The resulting compressed parameter data is transferred back to global RAM 491 where it is picked up by the network manager DSP for transmission. The network manager performs the multi-channel operation illustrated in FIGS. 14a and 14b. It may be noted that in this example, the voice data from up to 264 channels is routed to the network manager from the voice compression encoding process. The output from the voice compression encoding is a list of parameters which includes 1) Pitch epoch,
2) Rms power,
3) RC1–RC12,
4) Residue 1, and
5) Residue 2.

These parameters are prioritized by the encoding process to assist the network manager in determining which parameters can be dropped during high network traffic conditions or QoS partitioning. The network manager then packetizes the parameter data for transmission over the frame relay.

In reverse, the network manager transfers de-multiplexed compressed data received over the frame relay gateway to the appropriate DSP global RAM 491 for decompression by DSP modules 493, 495, 497 and 499. The decompressed voice channel data is transferred back to global RAM 491 where it is picked up by the appropriate T1/E1 DSP 483 for insertion into the appropriate channel time slot (channel #1 in the present case).

In one embodiment global RAM 491 acts as a multi-port memory between DSP bank 565 and T1/E1 interface module 563 during the transfer of voice data. FIGS. 19a and 19b illustrate a memory map of global RAM 491. Alternating transfer sequences are used for direct memory access (DMA) transfer in and out of global RAM 491. The sequence is configured such that while DSP module banks 565 are processing the incoming data, the T1/E1 DSPs are transferring data to and from global RAM 491. Timing for the data transfer process is controlled by T1/E1 interface modules 563. The frame interrupt is set when the 200th sample for each channel on a particular T1/E1 line is received. This process locks the frame rate to the line carrier frequency.

The principal VCU_256 apparatus modules are as follows:

1) System Configuration Manager,
2) Network Manager,
3) Performance Monitor,
4) Graphical User Interface,
5) ARVC Voice Compression Module,
6) Diagnostic Test Routines, and
7) Remote Access Interface.

In one embodiment additional software used in the VCU_256 apparatus includes Microsoft Windows NT 4.0 operating system, Option Pack 4.0, and CISCO 1605R Router Configuration Software.

The system application configuration manager (CM) software resides on the host computer and provides initialization of all system elements, generates resource queues, provides utilities for saving, creating and printing configuration files and resource reports and displays the graphical user interface (GUI). This is the first level application software that operates the VCU_256 apparatus. The top-level architecture of the configuration manager is illustrated in FIG. 17. All other VCU_256 application software flows from this system administrator.

In one embodiment the graphical user interface (GUI) is a series of Visual Basic forms that provide interfaces to all displays and menus associated with the SCM. The GUI is in standard windows format with pull down menus and size adjustable sub windows.

In one embodiment voice compression software for the VCU_256 apparatus to achieve the telecommunication method for voice channels described above is implemented on DSP chips and more fully described in the copending patent application referred to above. In this embodiment the software is coded in C++ and is resident on eleven of the twelve DSPs. The software processes either 24 or 30 channels per DSP, thus providing an overall capability of 264 full-duplex channels for T1 operation or 330 full-duplex channels for E1 operation.

The diagnostic test routines are a part of diagnostic level 461 of application configuration manager 449. These routines provide a rigorous examination of all hardware components of the VCU_256 apparatus. There are three levels of diagnostic routines associated with VCU_256. The first level is a quick test that checks the overall performance of the apparatus including its PSQM. The second level provides detail testing on a component basis and is primarily used for troubleshooting. The third level is an online set of diagnostic tests that are automatically run periodically to determine the status of the apparatus. When an error/alert condition exist, the appropriate warnings are issued. Data from this operation is also available through the remote access interface.

The purpose of the remote access interface (RAI) is to provide remote control of the apparatus over the Internet, or frame relay, DSL or ISDN lines. All controls/menus available from the apparatus console are also available remotely, thus providing configuration and administrative control from anywhere.

Mechanical Configuration

Figure 16:
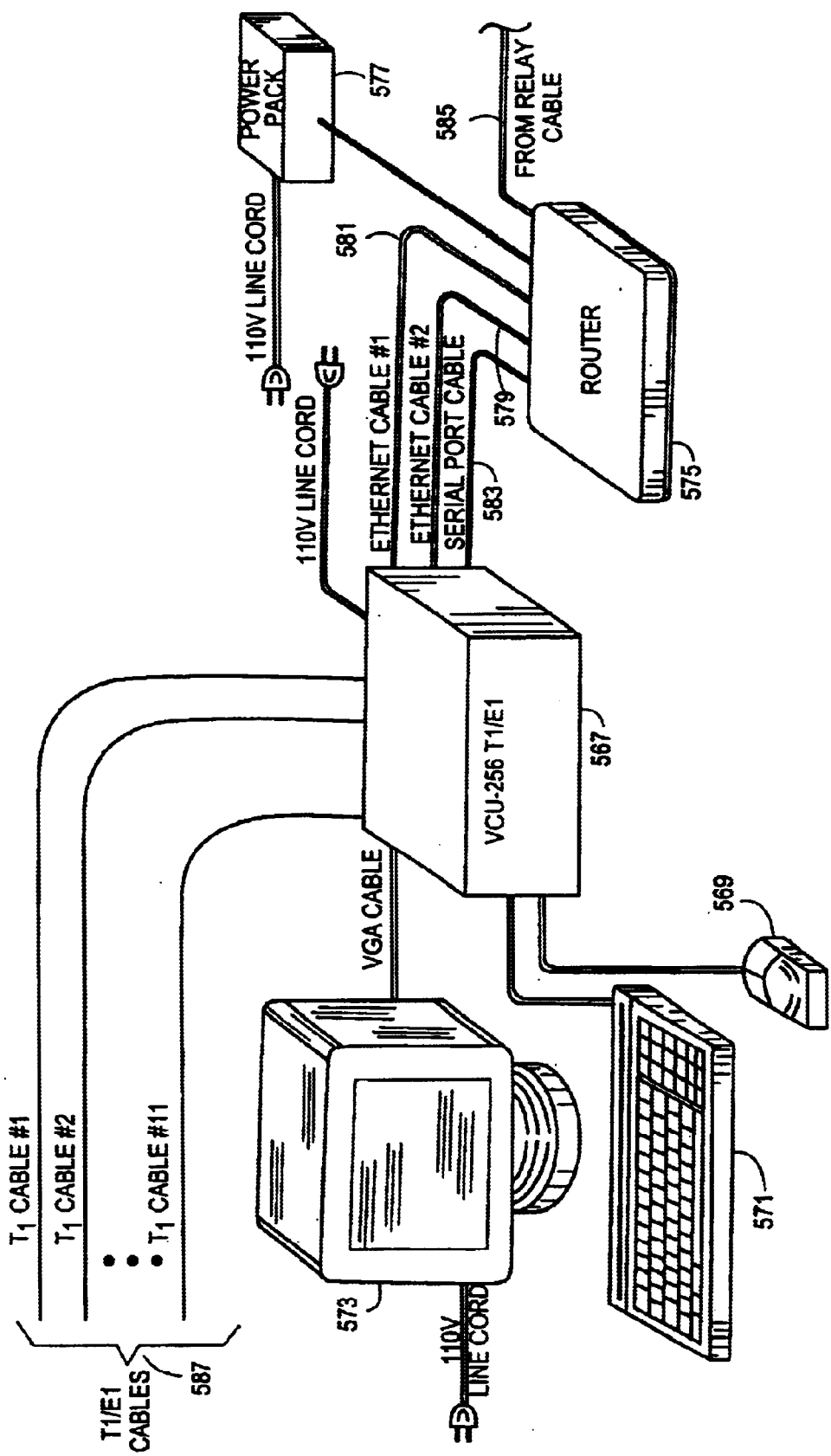
FIG. 16 illustrates a mechanical interconnect configuration of an embodiment of the invention.

FIG. 16 illustrates the VCU_256 mechanical interconnect configuration, including the cable connections between the various components associated with one embodiment of the invention. T1/E1 567 includes monitor 573, keyboard 571, and pointing device 569. Pointing device 569 may be a computer mouse or other similar device. These components are used to operate the system console functions. The apparatus interfaces to the PSTN lines using cables 587 with RJ45 connectors at the apparatus end. Two Ethernet cables connect VCU_256 to router 575. Router 575 may be a router device such as a CISCO 1605R router. Single Ethernet cable 581 is for the packet data and cable 579 is for the remote access connection. Serial port cable 583 connects the VCU_256 main controller to router 575. Router output cable 585 connects the system to the frame relay gateway port. Monitor 573, VCU_256 apparatus 567, and power source 577 of router 575 are connected to a (100–220 VAC) line power.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
a first telecommunication device coupled to a network to compress input data received via the network at a rate adjusted to improve data bandwidth while data integrity is maintained, said first telecommunication device compresses input data by setting priorities of each of a plurality of epoch data parameters based on said plurality of epoch data parameters influence on quality, and reducing said plurality of epoch data parameters based on each of said plurality of epoch data parameters respective dynamic priority based on trends and change of value from frame to frame, wherein said plurality of epoch data parameters include epoch length, epoch RMS value, a plurality of reflection coefficients and at least two residue descriptors, wherein the plurality of reflection coefficients are used to construct an inverse filter and the inverse filter is applied to an audio epoch to obtain an excitation residue used to derive the at least two residue descriptors;
a first router coupled to the first telecommunication device;
a gateway coupled to the first router and a second router; and
a second telecommunication device coupled to the second router, the second telecommunication device to decompress received data.

2. The system of claim 1, wherein the first telecommunication device compresses the input data over a particular input line of a plurality of input lines coupled to the first telecommunication device and the network and converts the compressed input data to a first format, and the first router converts the data in a first format to a second format.

3. The system of claim 2, wherein the first format is an Ethernet format and the second format is a frame relay format.

4. The system of claim 2, wherein the first telecommunication device includes a dual-tone multiple frequency (DTMF) detector interfaced with each of the plurality of input lines to receive the input data and decode input data tones which are indicative of signal and call data for an incoming call.

5. The system of claim 4, wherein the first telecommunication device further includes a first network manager having a packing queue to store information corresponding to the signal and call data of the incoming call decoded by the DTMF detector, the first network manager to convert the information stored in the packing queue into digital network frame relay packets in Ethernet format for transmission to the first router.

6. The system of claim 5, wherein the first telecommunication device comprises:
a second network manager to receive the digital network frame relay packet information after the second router converts the frame relay packets from frame relay format to Ethernet format, wherein the second data network manager extracts the signal and call information from the digital network frame relay packets;
a DTMF generator to cause tones to be generated depending upon the signal and call information extracted by the second data network manager; and
a time division multiplexer coupled to the plurality of output lines, into which the tones generated by the DTMF generator are inserted.

7. The system of claim 6, wherein the first network manager of the first telecommunication device is responsive to whether the signal data on respective ones of the plurality of input lines is either one of FAX/DATA, modem data, and voice data.

8. The system of claim 7, wherein the first telecommunication device further comprises:
an origination voice data handler enabled when the signal data on at least one of the plurality of input lines is voice data to buffer the voice data; and
a voice compression processor, the origination voice data handler to compress the voice data and insert compressed data into the digital network frame relay packets for transmission.

9. The system of claim 1, wherein the network is a public switched telephone network (PSTN) interface having at least three digital signal processor interface modules coupled to at least eleven data input lines.

10. The system of claim 9, wherein the at least eleven data input lines and a plurality of output lines coupled to the second router are one of T1 telecommunication lines and E1 telecommunication lines.

11. The system of claim 1, wherein the plurality of input lines and a plurality of output lines coupled to the second router are one of T1 telecommunication lines and E1 telecommunication lines.

12. The system of claim 1, wherein the gateway is a frame relay gateway.

13. A system comprising:
a first telecommunication device to receive input data from a public switched telephone network (PSTN) via a plurality of input lines at a rate adjusted to improve data bandwidth while data integrity is maintained, the first telecommunication device to compress the input data over a particular input line of the plurality of input lines and convert the compressed input data to an Ethernet format, said first telecommunication device compresses input data by setting priorities of each of a plurality of epoch data parameters based on said plurality of epoch data parameters influence on quality, and reducing said plurality of epoch data parameters based on each of said plurality of epoch data parameters dynamic respective priority based on trends and change of value from frame to frame, wherein said plurality of epoch data parameters include epoch length, epoch RMS value, a plurality of reflection coefficients and at least two residue descriptors, wherein the plurality of reflection coefficient are used to construct an inverse filter and the inverse filter is applied to an audio epoch to obtain an excitation residue used to derive the at least two residue descriptors;

a first router to convert the data in Ethernet format to a frame relay format coupled to the first telecommunication device;

a frame relay gateway coupled to the first router and a second router, the second router to convert the input data in frame relay format back to Ethernet format a second telecommunication device coupled to the second router, the second telecommunication device to decompress the data converted back to Ethernet format byte second router to be routed back to the network via a plurality of output lines, the second telecommunication device responding in an opposite direction to the first telecommunication device by way of the first router, second router and the frame relay gateway; and a remote personal computer (PC) based controller coupled to the gateway via a remote router to control the transmission, compression and decompression of the input data from the first telecommunication device to the second telecommunication device.

14. The system of claim 13, wherein the plurality of input lines and the plurality of output lines are one of T1 telecommunication lines and E1 telecommunication lines.

15. The system of claim 13, wherein the remote router is part of an Internet service provider network (ISPN).

16. The system of claim 13, wherein the first telecommunication device includes a dual-tone multiple frequency (DTMF) detector interfaced with each of the plurality of input lines to receive the input data and decode input data tones which are indicative of signal and call data for an incoming call.

17. The system of claim 16, wherein the first telecommunication device further includes a first network manager having a packing queue to store information corresponding to the signal and call data of the incoming call decoded by the DTMF detector, the first network manager to convert the information stored in the packing queue into digital network frame relay packets in Ethernet format for transmission to the first router.

18. The system of claim 17, wherein the first telecommunication device comprises:

a second network manager to receive the digital network frame relay packet information after the second router converts the frame relay packets from frame relay format to Ethernet format, the second data network manager to extract the signal and call information from the digital network frame relay packets;

a DTMF generator to cause tones to be generated depending upon the signal and call information extracted by the second data network manager; and a time division multiplexer into which the tones generated by the DTMF generator are inserted, the time division multiplexer coupled to the plurality of output lines.

19. The system of claim 18, wherein the first network manager of the first telecommunication device is responsive to whether the signal data on respective ones of said plurality of input lines is either one of FAX/DATA, modem data, and voice data.

20. The system of claim 13, wherein the first telecommunication device comprises:

a public switched telephone network (PSTN) interface coupled between the plurality of input lines and the first router.

21. The system of claim 20, wherein the PSTN interface comprises:

a plurality of digital signal processor interface modules coupled to the plurality of input lines, a plurality of digital signal processor modules to communicate with the plurality of digital signal processor interface modules over a peripheral component interconnect (PCI) bus in order to process the input data on the input lines, and a virtual machine environment (VME) computer to link the plurality of digital signal processor interface modules to the plurality of digital signal processor modules over the VME bus and to control the conversion of the compressed input data to an Ethernet format.

22. The system of claim 21, wherein the PSTN interface has at least three digital signal processor interface modules coupled to at least eleven input lines.

23. The system of claim 22, wherein the input lines are one of T1 telecommunication lines and E1 telecommunication lines.

24. The system of claim 23, wherein each of the at least three digital signal processor interface modules of the PSTN interface includes a phase locked dock to clock in the input data on each of the plurality of input T1 telecommunications lines, means by which to perform framing bit detection on the input data, and a memory to buffer and store resulting frame synchronization data, and means to process and supply the frame synchronization data to the plurality of digital signal processor modules over the PCI bus.

25. An apparatus comprising:

an origination telecommunication device to receive input data from a network via a plurality of input lines, the origination telecommunication device to compress the input data over a particular input line of plurality of input lines at a rate adjusted to improve data bandwidth while data integrity is maintained and converts the compressed input data to a first format, said origination telecommunication device compresses input data by setting priorities of each of a plurality of epoch data parameters based on said plurality of epoch data parameters influence on quality, and reducing said plurality of epoch data parameters based on each of said plurality of epoch data parameters dynamic respective priority to improve data bandwidth based on trends and change of value from frame to frame, wherein said plurality of epoch data parameters include epoch length, epoch RMS value, a plurality of reflection coefficients and at least two residue descriptors, wherein the plurality of reflection coefficients are used to construct an inverse filter and the inverse filter is applied to an audio epoch to obtain an excitation residue used to derive the at least two residue descriptors; and a router coupled to the origination telecommunication device, the first router to convert the data in a first format to a second format.

26. The apparatus of claim 25, wherein the first format is an Ethernet format and the second format is a frame relay format.

27. The apparatus of claim 25, wherein the plurality of input are one of T1 telecommunication lines and E1 telecommunication lines.

28. The apparatus of claim 25, wherein the origination telecommunication device comprises:
  a dual-tone multiple frequency (DTMF) detector interfaced with each of the plurality of input lines to receive the input data and decode input data tones which are indicative of signal and call data for an incoming call.

29. The apparatus of claim 28, wherein the origination telecommunication device further comprises:
  a first network manager having a packing queue to store information corresponding to the signal and call data of the incoming call decoded by the DTMF detector, the first network manager to convert the information stored in the packing queue into digital network frame relay packets in Ethernet format for transmission to the router.

30. The apparatus of claim 29, wherein the origination telecommunication device further comprises:
  a second network manager to receive the digital network frame relay packet information, the second data network manager to extract the signal and call information from the digital network frame relay packets;
  a DTMF generator to cause tones to be generated depending upon the signal and call information extracted by the second data network manager; and
  a time division multiplexer coupled to the plurality of output lines, into which the tones generated by the DTMF generator are inserted.

31. The apparatus of claim 30, wherein the first network manager of the origination telecommunication device is responsive to whether the signal data on respective ones of the plurality of input lines is either one of FAX/DATA, modem data, and voice data.

32. An apparatus comprising:
  a destination telecommunication device;
  a router coupled to the destination telecommunication device, the router converting data received in a first format to a second format,
  the destination telecommunication device to decompress data to be routed back to a network via a plurality of output lines and wherein a decompression rate is adjusted to improve data bandwidth while data integrity is maintained, said destination telecommunication device decompresses data by dynamically setting priorities of each of a plurality of epoch data parameters based on said plurality of epoch data parameters influence on quality based on trends and change of value from Frame to frame, and reducing said plurality of epoch data parameters based on each of said plurality of epoch data parameters respective priority to improve data bandwidth, wherein said plurality of epoch data parameters include epoch length, epoch RMS value, a plurality of reflection coefficients and at least two residue descriptors, wherein the plurality of reflection coefficients are used to construct an inverse filter and the inverse filter is applied to an audio epoch to obtain an excitation residue used to derive the at least two residue descriptors.

33. The apparatus of claim 32, wherein the first format is a frame relay format and the second format is a Ethernet format.

34. The apparatus of claim 32, wherein the plurality of output lines are one of T1 telecommunication lines and E1 telecommunication lines.

35. The apparatus of claim 32, wherein the destination telecommunication device further comprises:
  a destination modem data handler; and
  a modem data generator.

36. The apparatus of claim 35, wherein when digital network frame relay packets contain compressed modem data are received the destination modem data handler decompresses the compressed modem data and the modem data generator remodulates the modem data to be slotted into a time division multiplexer.

37. The apparatus of claim 32, wherein the destination telecommunication device further comprises:
  a voice compression decoder; and
  a destination voice data handler.

38. The apparatus of claim 37, wherein when digital network frame relay packets contain compressed voice data are received the voice compression decoder decompresses and reconstructs the compressed voice data and the destination voice data handler buffers the reconstructed voice data to be slotted into a time division multiplexer.

39. A method comprising:
  receiving input data front a network on a first telecommunication device at a rate adjusted to improve data bandwidth while data integrity is maintained;
  compressing the received input data to a first format, said compressing of input data includes:
    dynamically setting priorities of each of a plurality of epoch data parameters based on said plurality of epoch data parameters influence on quality based on trends and change of value from frame to frame,
    reducing said plurality of epoch data parameters based on each of said plurality of epoch data parameters respective priority, wherein said plurality of epoch data parameters include epoch length, epoch RMS value, a plurality of reflection coefficients and a plurality of residue descriptors, wherein the plurality of reflection coefficients are used to construct an inverse filter and the inverse filter is applied to an audio epoch to obtain an excitation residue used to derive the at least two residue descriptors;
  converting the received data in the first format to a second format;
  transmitting the data in the second format;
  receiving the data in the second format;
  converting the data received in the second format to the first format; and
  transmitting the data to a second telecommunication device.

40. The method of claim 39, wherein the first format is an Ethernet format and the second format is a frame relay format.

41. The method of claim 39, wherein receiving the input data further comprises:
  decoding input data tones which are indicative of signal and call data for an incoming call via a dual-tone multiple frequency (DTMF) detector.

42. The method of claim 41, further comprising:
  storing information corresponding to the signal and call data of the incoming call, and converting the information stored into digital network frame relay packets in Ethernet format for transmission.

43. The method of claim 42, further comprising:
generating DTMF tones depending on the signal and call information, and inserting the DTMF tones in a time division multiplexer.

44. The method of claim 41, wherein the signal data is one of FAX/DATA, modem data, and voice data.

45. A program storage device readable by a machine comprising instructions that cause the machine to:
receive input data from a network on a first telecommunication device at a rate adjusted to improve data bandwidth while data integrity is maintained;
compress the received input data to a first format, said compress including instructions that further cause the machine to:
set priorities of each of a plurality of epoch data parameters dynamically based on said plurality of epoch data parameters influence on quality based on trends and change of value from frame to frame,
reduce said plurality of epoch data parameters based on each of said plurality of epoch data parameters respective priority, wherein said plurality of epoch data parameters include epoch length, epoch RMS value, a plurality of reflection coefficients and at least two residue descriptors, wherein the plurality of reflection coefficients are used to construct an inverse filter and the inverse filter is applied to an audio epoch to obtain an excitation residue used to derive the at least two residue descriptors;
convert the received data in the first format to a second format;
transmit the data in the second format;
receive the data in the second format;
convert the data received in the second format back to the first format; and
transmit the data to a second telecommunication device.

46. The program storage device of claim 45, wherein the first format is an Ethernet format and the second format is a frame relay format.

47. The program storage device of claim 45, further comprising instructions that cause the machine to:
decode input data tones which are indicative of signal and call data for an incoming call via a dual-tone multiple frequency (DTMF) detector.

48. The program storage device of claim 47, wherein the instructions further cause the machine to:
store information corresponding to the signal and call data of the incoming call; and
convert the information stored into digital network frame relay packets in Ethernet format for transmission.

49. The program storage device of claim 48, wherein the instructions further cause the machine to:
generate DTMF tones depending on the signal and call information; and
insert the DTMF tones in a time division multiplexer.

50. The program storage device of claim 47, wherein the signal data is one of FAX/DATA, modem data, and voice data.

* * * * *

UNITED STATES PATENT AND TRADEMARK OFFICE
CERTIFICATE OF CORRECTION

PATENT NO.       : 6,721,282 B2  Page 1 of 1
APPLICATION NO.  : 09/759733
DATED            : April 13, 2004
INVENTOR(S)      : Motley It is certified that error appears in the above-identified patent and that said Letters Patent is hereby corrected as shown below:

Col. 21, line 30, please delete "format" and insert -- format; --.

Signed and Sealed this

Sixteenth Day of September, 2008

JON W. DUDAS
*Director of the United States Patent and Trademark Office*